US010039978B2

(12) United States Patent
Gault et al.

(10) Patent No.: US 10,039,978 B2
(45) Date of Patent: Aug. 7, 2018

(54) ADD-ON MANAGEMENT SYSTEMS

(75) Inventors: Andrew Buchanan Gault, Newport Beach, CA (US); Rui Filipe Andrade Pereira, Aliso Viejo, CA (US); David Perry, Monarch Beach, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 456 days.

(21) Appl. No.: 13/231,751

(22) Filed: Sep. 13, 2011

(65) Prior Publication Data

US 2012/0064975 A1     Mar. 15, 2012

Related U.S. Application Data

(60) Provisional application No. 61/382,470, filed on Sep. 13, 2010.

(51) Int. Cl.
| | | |
|---|---|---|
| G06F 9/445 | (2018.01) |
| A63F 13/355 | (2014.01) |
| A63F 13/77 | (2014.01) |
| A63F 13/79 | (2014.01) |
| A63F 13/60 | (2014.01) |

(Continued)

(52) U.S. Cl.
CPC .......... *A63F 13/355* (2014.09); *A63F 13/60* (2014.09); *A63F 13/77* (2014.09); *A63F 13/79* (2014.09); *H04L 67/38* (2013.01); *H04N 21/241* (2013.01); *H04N 21/25808* (2013.01); *H04N 21/4781* (2013.01); *A63F 2300/209* (2013.01); *A63F 2300/538* (2013.01); *A63F 2300/552* (2013.01);

(Continued)

(58) Field of Classification Search
CPC .......... H04N 21/25808; H04N 21/2355; A63F 2300/538; A63F 2300/552; G06Q 10/10; A61B 6/00; A61B 6/467; G06F 9/44526
USPC ........................................................ 709/231
See application file for complete search history.

(56) References Cited

U.S. PATENT DOCUMENTS

| | | | |
|---|---|---|---|
| 4,372,558 A | 2/1983 | Shimamoto et al. |
| 5,263,723 A | 11/1993 | Pearson et al. |

(Continued)

FOREIGN PATENT DOCUMENTS

| | | | |
|---|---|---|---|
| EP | 1104686 A1 | 6/2001 |
| EP | 1479422 A2 | 11/2004 |

(Continued)

OTHER PUBLICATIONS

U.S. Appl. No. 12/826,130 Non-Final Office Action dated Apr. 17, 2012.

(Continued)

*Primary Examiner* — James S McClellan
*Assistant Examiner* — Syvila Weatherford
(74) *Attorney, Agent, or Firm* — Martine Penilla Group, LLP

(57) ABSTRACT

A computing system is configured to execute a computer program on a server and to provide a video stream of the program output to a geographically remote client over a communication network. An add-on manager is provided to facilitate the use of add-ons to extend the functionality of the computer program. The add-on manager is responsive to commands received from the client and is configured to associate individual add-ons and add-on data with specific user accounts. The add-ons can be located on the server or some other location remote from the client.

28 Claims, 5 Drawing Sheets

(51) Int. Cl.
  *H04N 21/241* (2011.01)
  *H04N 21/258* (2011.01)
  *H04N 21/478* (2011.01)
  *H04L 29/06* (2006.01)
(52) U.S. Cl.
  CPC ...... *G06F 9/44521* (2013.01); *G06F 9/44526* (2013.01); *H04L 65/602* (2013.01)

(56) References Cited

U.S. PATENT DOCUMENTS

| | | |
|---|---|---|
| 5,411,270 A | 5/1995 | Naka et al. |
| 5,553,864 A | 9/1996 | Sitrick |
| 5,558,339 A | 9/1996 | Perlman |
| 5,586,247 A | 12/1996 | Yoshifuji et al. |
| 5,623,424 A | 4/1997 | Azadagan et al. |
| 5,636,209 A | 6/1997 | Perlman |
| 5,641,319 A | 6/1997 | Stoel |
| 5,685,775 A | 11/1997 | Bakoglu et al. |
| 5,689,577 A | 11/1997 | Arata |
| 5,696,892 A | 12/1997 | Redmann et al. |
| 5,707,286 A | 1/1998 | Carlson |
| 5,738,583 A | 4/1998 | Comas et al. |
| 5,742,289 A | 4/1998 | Naylor et al. |
| 5,775,996 A | 7/1998 | Othmer et al. |
| 5,790,713 A | 8/1998 | Kamada et al. |
| 5,793,985 A | 8/1998 | Natarajan et al. |
| 5,828,370 A | 10/1998 | Moeller et al. |
| 5,846,132 A | 12/1998 | Junkin |
| 5,852,672 A | 12/1998 | Lu |
| 5,878,283 A | 3/1999 | House et al. |
| 5,884,101 A | 3/1999 | Wu |
| 5,889,499 A | 3/1999 | Nally et al. |
| 5,899,810 A | 5/1999 | Smith |
| 5,905,988 A | 5/1999 | Schwartz et al. |
| 5,926,208 A | 7/1999 | Noonen et al. |
| 5,956,485 A | 9/1999 | Perlman |
| 5,966,129 A | 10/1999 | Matsukuma et al. |
| 5,974,442 A | 10/1999 | Adams |
| 5,974,503 A | 10/1999 | Venkatesh et al. |
| 5,991,443 A | 11/1999 | Gallery et al. |
| 6,005,561 A | 12/1999 | Hawkins et al. |
| 6,015,344 A | 1/2000 | Kelly et al. |
| 6,025,801 A | 2/2000 | Beitel |
| 6,039,648 A | 3/2000 | Guinn et al. |
| 6,050,898 A | 4/2000 | Vange et al. |
| 6,102,969 A | 8/2000 | Christianson et al. |
| 6,115,038 A | 9/2000 | Christofferson et al. |
| 6,128,660 A | 10/2000 | Grimm et al. |
| 6,152,824 A | 11/2000 | Rothschild et al. |
| 6,210,274 B1 | 4/2001 | Carlson |
| 6,238,290 B1 | 5/2001 | Tarr et al. |
| 6,241,612 B1 | 6/2001 | Heredia |
| 6,272,223 B1 | 8/2001 | Carlson |
| 6,300,952 B1 | 10/2001 | Sidwell et al. |
| 6,342,892 B1 | 1/2002 | Van Hook et al. |
| 6,370,564 B2 | 4/2002 | Bretscher |
| 6,390,922 B1 | 5/2002 | Vange et al. |
| 6,409,602 B1 | 6/2002 | Wiltshire et al. |
| 6,415,317 B1 | 7/2002 | Yelon et al. |
| 6,426,748 B1 | 7/2002 | Megahed |
| 6,428,413 B1 | 8/2002 | Carlson |
| 6,453,334 B1 | 9/2002 | Vinson et al. |
| 6,475,090 B2 | 11/2002 | Roelofs |
| 6,539,354 B1 | 3/2003 | Sutton et al. |
| 6,583,793 B1 | 6/2003 | Gould et al. |
| 6,587,109 B1 | 7/2003 | Rose et al. |
| 6,606,746 B1 | 8/2003 | Zdepski et al. |
| 6,665,453 B2 | 12/2003 | Scheurich |
| 6,665,872 B1 | 12/2003 | Krishnamurthy et al. |
| 6,687,663 B1 | 2/2004 | McGrath et al. |
| 6,754,241 B1 | 6/2004 | Krishnamurthy et al. |
| 6,755,743 B1 | 6/2004 | Yamashita et al. |
| 6,763,371 B1 | 7/2004 | Jandel |
| 6,791,579 B2 | 9/2004 | Markel |
| 6,792,615 B1 | 9/2004 | Rowe et al. |
| 6,810,528 B1 | 10/2004 | Chatani |
| 6,848,997 B1 | 2/2005 | Hashimoto et al. |
| 6,863,612 B2 | 3/2005 | Willis |
| 6,884,172 B1 | 4/2005 | Lloyd et al. |
| 6,908,390 B2 | 6/2005 | Nguyen et al. |
| 6,918,113 B2 | 7/2005 | Patel et al. |
| 6,959,320 B2 | 10/2005 | Shah et al. |
| 6,963,353 B1 | 11/2005 | Firestone |
| 6,970,910 B2 | 11/2005 | Murai |
| 6,986,055 B2 | 1/2006 | Carlson |
| 6,996,742 B2 | 2/2006 | Lerman et al. |
| 7,023,918 B2 | 4/2006 | Yu et al. |
| 7,038,676 B2 | 5/2006 | Iwata et al. |
| 7,043,524 B2 | 5/2006 | Shah et al. |
| 7,062,567 B2 | 6/2006 | Benitez et al. |
| 7,072,693 B2 | 7/2006 | Farlow et al. |
| 7,075,993 B2 | 7/2006 | O'Brien, Jr. |
| 7,090,577 B2 | 8/2006 | Serizawa et al. |
| 7,096,253 B2 | 8/2006 | Vinson et al. |
| 7,133,368 B2 | 11/2006 | Zhang et al. |
| 7,135,985 B2 | 11/2006 | Woolgar et al. |
| 7,158,679 B2 | 1/2007 | Sano et al. |
| 7,227,894 B2 | 6/2007 | Lin et al. |
| 7,240,162 B2 | 7/2007 | de Vries |
| 7,246,183 B2 | 7/2007 | Covington et al. |
| 7,260,834 B1 | 8/2007 | Carlson |
| 7,270,605 B2 | 9/2007 | Russell et al. |
| 7,274,368 B1 | 9/2007 | Keslin |
| 7,275,987 B2 | 10/2007 | Shimakawa et al. |
| 7,292,588 B2 | 11/2007 | Milley et al. |
| 7,295,608 B2 | 11/2007 | Reynolds et al. |
| 7,297,062 B2 | 11/2007 | Gatto et al. |
| 7,299,487 B1 | 11/2007 | Campbell et al. |
| 7,305,697 B2 | 12/2007 | Alao et al. |
| 7,448,063 B2 | 11/2008 | Freeman et al. |
| 7,451,196 B1 | 11/2008 | de Vries et al. |
| 7,577,751 B2 | 8/2009 | Vinson et al. |
| 7,587,520 B1 | 9/2009 | Kent et al. |
| 7,721,117 B2 | 5/2010 | Sherer et al. |
| 7,731,586 B2 | 6/2010 | Letovsky et al. |
| 7,739,715 B2 | 6/2010 | He et al. |
| 7,751,480 B2 | 7/2010 | Yavits et al. |
| RE41,618 E | 8/2010 | Florschuetz |
| 7,804,856 B2 | 9/2010 | Krause et al. |
| 7,818,444 B2 | 10/2010 | Brueck et al. |
| 7,818,769 B2 | 10/2010 | Peacock et al. |
| 7,841,946 B2 | 11/2010 | Walker et al. |
| 7,864,186 B2 | 1/2011 | Robotham et al. |
| 7,877,776 B2 | 1/2011 | Krikorian et al. |
| 7,916,147 B2 | 3/2011 | Clemie et al. ............... 345/522 |
| 7,936,819 B2 | 5/2011 | Craig et al. |
| 7,953,883 B2 | 5/2011 | Thomas et al. |
| 8,081,192 B2 | 12/2011 | Clemie et al. ............... 345/522 |
| 8,095,400 B2 | 1/2012 | Herde et al. |
| 8,152,631 B2 | 4/2012 | Anderson |
| 8,203,568 B2 | 6/2012 | Clemie et al. ............... 345/522 |
| 2001/0044339 A1 | 11/2001 | Cordero et al. |
| 2002/0030675 A1 | 3/2002 | Kawai |
| 2002/0034980 A1 | 3/2002 | Lemmons et al. |
| 2002/0053075 A1 | 5/2002 | Paz et al. |
| 2002/0056120 A1 | 5/2002 | McTernan et al. |
| 2002/0059637 A1 | 5/2002 | Rakib |
| 2002/0061062 A1 | 5/2002 | O'Brien |
| 2002/0073429 A1 | 6/2002 | Beane et al. |
| 2002/0075382 A1 | 6/2002 | Cohen |
| 2002/0083461 A1 | 6/2002 | Hutcheson et al. |
| 2002/0111212 A1 | 8/2002 | Muir |
| 2002/0115487 A1 | 8/2002 | Wells |
| 2002/0128065 A1 | 9/2002 | Chung et al. |
| 2002/0154691 A1 | 10/2002 | Kost et al. |
| 2002/0166119 A1 | 11/2002 | Cristofalo |
| 2002/0184303 A1 | 12/2002 | Uner |
| 2002/0186769 A1 | 12/2002 | O'Brien |
| 2002/0191699 A1 | 12/2002 | O'Brien |
| 2002/0191701 A1 | 12/2002 | O'Brien, Jr. |
| 2003/0004882 A1 | 1/2003 | Holler et al. |
| 2003/0037156 A1 | 2/2003 | Mallart |
| 2003/0048808 A1 | 3/2003 | Stahl et al. |

(56) References Cited

U.S. PATENT DOCUMENTS

| | | |
|---|---|---|
| 2003/0056112 A1 | 3/2003 | Vinson et al. |
| 2003/0060285 A1 | 3/2003 | Itakura |
| 2003/0072370 A1 | 4/2003 | Girod et al. |
| 2003/0083132 A1 | 5/2003 | Berg et al. |
| 2003/0093806 A1 | 5/2003 | Dureau et al. |
| 2003/0130040 A1 | 7/2003 | Dripps |
| 2003/0152080 A1 | 8/2003 | O'Brien |
| 2003/0174772 A1 | 9/2003 | Voronov et al. |
| 2003/0174774 A1 | 9/2003 | Mock et al. |
| 2003/0177187 A1 | 9/2003 | Levine et al. |
| 2003/0190952 A1 | 10/2003 | Smith et al. |
| 2003/0214502 A1 | 11/2003 | Park et al. |
| 2003/0228906 A1 | 12/2003 | Walker et al. |
| 2003/0234790 A1 | 12/2003 | Hochmuth et al. |
| 2004/0022391 A1 | 2/2004 | O'Brien |
| 2004/0034870 A1 | 2/2004 | O'Brien et al. |
| 2004/0052371 A1 | 3/2004 | Watanabe |
| 2004/0063498 A1 | 4/2004 | Oakes et al. |
| 2004/0064504 A1 | 4/2004 | Domschitz |
| 2004/0072091 A1 | 4/2004 | Mochizuki et al. |
| 2004/0102245 A1 | 5/2004 | Escalera et al. |
| 2004/0111755 A1 | 6/2004 | Perlman |
| 2004/0119716 A1 | 6/2004 | Park et al. |
| 2004/0155962 A1 | 8/2004 | Marks |
| 2004/0176170 A1* | 9/2004 | Eck et al. ............ 463/43 |
| 2004/0209660 A1 | 10/2004 | Carlson et al. |
| 2004/0222988 A1 | 11/2004 | Donnelly |
| 2004/0252632 A1 | 12/2004 | Bourdoux et al. |
| 2005/0024363 A1 | 2/2005 | Estrop |
| 2005/0054423 A1 | 3/2005 | Wadleigh |
| 2005/0080915 A1 | 4/2005 | Shoemaker et al. |
| 2005/0100229 A1 | 5/2005 | Becker et al. |
| 2005/0104543 A1 | 5/2005 | Kazanov et al. |
| 2005/0104889 A1 | 5/2005 | Clemie et al. |
| 2005/0125825 A1 | 6/2005 | Nakayama |
| 2005/0174771 A1 | 8/2005 | Conner |
| 2005/0193139 A1 | 9/2005 | Vinson et al. |
| 2005/0193209 A1 | 9/2005 | Saunders et al. |
| 2005/0282636 A1 | 12/2005 | O'Bbrien |
| 2005/0283734 A1 | 12/2005 | Santoro et al. |
| 2005/0286777 A1 | 12/2005 | Kumar et al. |
| 2006/0038879 A1 | 2/2006 | Kremen |
| 2006/0048136 A1 | 3/2006 | Vries et al. |
| 2006/0050972 A1 | 3/2006 | Reznic et al. |
| 2006/0069623 A1 | 3/2006 | MacDonald Korth et al. |
| 2006/0069796 A1 | 3/2006 | Lucas et al. |
| 2006/0069797 A1 | 3/2006 | Abdo et al. |
| 2006/0104353 A1 | 5/2006 | Johnson et al. |
| 2006/0111188 A1* | 5/2006 | Winkler ............ 463/42 |
| 2006/0117344 A1 | 6/2006 | Lamkin et al. |
| 2006/0121991 A1 | 6/2006 | Borinik et al. |
| 2006/0123185 A1 | 6/2006 | de Vries et al. |
| 2006/0126728 A1 | 6/2006 | Yu et al. |
| 2006/0146057 A1 | 7/2006 | Blythe |
| 2006/0165235 A1 | 7/2006 | Carlson |
| 2006/0168294 A1 | 7/2006 | de Vries et al. |
| 2006/0195884 A1 | 8/2006 | van Zoest et al. |
| 2006/0218225 A1* | 9/2006 | Hee Voon et al. ............ 709/201 |
| 2006/0224761 A1* | 10/2006 | Howarth et al. ............ 709/231 |
| 2006/0230175 A1 | 10/2006 | de Vries |
| 2006/0230428 A1 | 10/2006 | Craig et al. |
| 2006/0258463 A1 | 11/2006 | Cugno et al. |
| 2006/0262979 A1 | 11/2006 | Srinivasan et al. |
| 2006/0282855 A1 | 12/2006 | Margulis |
| 2007/0005795 A1 | 1/2007 | Gonzalez |
| 2007/0009035 A1 | 1/2007 | Craig et al. |
| 2007/0011712 A1 | 1/2007 | White et al. |
| 2007/0036462 A1 | 2/2007 | Crandall et al. |
| 2007/0047901 A1 | 3/2007 | Ando et al. |
| 2007/0058937 A1 | 3/2007 | Ando et al. |
| 2007/0121629 A1 | 5/2007 | Cuijpers et al. |
| 2007/0155507 A1 | 7/2007 | Gatto et al. |
| 2007/0168466 A1 | 7/2007 | Tooley et al. |
| 2007/0172133 A1 | 7/2007 | Kim et al. |
| 2007/0202941 A1 | 8/2007 | Miltenberger et al. |
| 2007/0211720 A1 | 9/2007 | Fuchs et al. |
| 2007/0226364 A1 | 9/2007 | Landspurg |
| 2007/0254742 A1 | 11/2007 | O'Brien |
| 2007/0260677 A1 | 11/2007 | DeMarco et al. |
| 2007/0265073 A1 | 11/2007 | Novi et al. |
| 2007/0265094 A1 | 11/2007 | Tone et al. |
| 2007/0266170 A1 | 11/2007 | Mockett |
| 2007/0275780 A1 | 11/2007 | Sloate et al. |
| 2008/0008439 A1 | 1/2008 | Liu et al. |
| 2008/0015003 A1 | 1/2008 | Walker et al. |
| 2008/0025390 A1 | 1/2008 | Shi et al. |
| 2008/0032788 A1 | 2/2008 | Carlson |
| 2008/0039204 A1 | 2/2008 | Ackley et al. |
| 2008/0089423 A1 | 4/2008 | Karczewicz |
| 2008/0098080 A1 | 4/2008 | Daigle et al. |
| 2008/0109876 A1 | 5/2008 | Hitomi et al. |
| 2008/0133715 A1 | 6/2008 | Yoneda et al. |
| 2008/0146342 A1 | 6/2008 | Harvey et al. |
| 2008/0178298 A1 | 7/2008 | Arai et al. |
| 2008/0194332 A1 | 8/2008 | Kadikario et al. |
| 2008/0194334 A1 | 8/2008 | Kuok et al. |
| 2008/0195743 A1 | 8/2008 | Brueck et al. |
| 2008/0207322 A1 | 8/2008 | Mizrahi |
| 2008/0220869 A1 | 9/2008 | Midgley et al. |
| 2008/0234047 A1 | 9/2008 | Nguyen |
| 2008/0254891 A1 | 10/2008 | Saunders et al. |
| 2008/0261679 A1 | 10/2008 | Carlson |
| 2008/0268947 A1 | 10/2008 | Fyock et al. |
| 2008/0279183 A1 | 11/2008 | Wiley et al. |
| 2008/0284798 A1 | 11/2008 | Weybrew et al. |
| 2008/0287181 A1 | 11/2008 | Carlson |
| 2008/0288380 A1 | 11/2008 | Nam et al. |
| 2008/0291208 A1 | 11/2008 | Keall |
| 2009/0062014 A1 | 3/2009 | Gift et al. |
| 2009/0081964 A1 | 3/2009 | Buznach |
| 2009/0093312 A1 | 4/2009 | Carlson |
| 2009/0103607 A1 | 4/2009 | Bajpai et al. |
| 2009/0118017 A1 | 5/2009 | Perlman et al. |
| 2009/0118018 A1 | 5/2009 | Perlman |
| 2009/0118019 A1 | 5/2009 | Perlman |
| 2009/0119458 A1 | 5/2009 | de Vries et al. |
| 2009/0119644 A1 | 5/2009 | de Vries et al. |
| 2009/0119729 A1 | 5/2009 | Periman |
| 2009/0119730 A1 | 5/2009 | Perlman |
| 2009/0119731 A1 | 5/2009 | Perlman |
| 2009/0119736 A1 | 5/2009 | Perlman |
| 2009/0119737 A1 | 5/2009 | Perlman |
| 2009/0119738 A1 | 5/2009 | Perlman |
| 2009/0122878 A1 | 5/2009 | Liu et al. |
| 2009/0124387 A1 | 5/2009 | Perlman |
| 2009/0125961 A1 | 5/2009 | Perlman |
| 2009/0125967 A1 | 5/2009 | Perlman |
| 2009/0125968 A1 | 5/2009 | Perlman |
| 2009/0131177 A1 | 5/2009 | Pearce |
| 2009/0147292 A1 | 6/2009 | Shimura |
| 2009/0196516 A1 | 8/2009 | Perlman |
| 2009/0213871 A1 | 8/2009 | Carlson |
| 2009/0213927 A1 | 8/2009 | Perlman |
| 2009/0213935 A1 | 8/2009 | Perlman |
| 2009/0215531 A1 | 8/2009 | Perlman |
| 2009/0215540 A1 | 8/2009 | Perlman |
| 2009/0220001 A1 | 9/2009 | van der Laan et al. |
| 2009/0220002 A1 | 9/2009 | van der Laan et al. |
| 2009/0225076 A1 | 9/2009 | Vlietinck |
| 2009/0225220 A1 | 9/2009 | van der Laan et al. |
| 2009/0225828 A1 | 9/2009 | Perlman et al. |
| 2009/0225863 A1 | 9/2009 | Perlman et al. |
| 2009/0228936 A1 | 9/2009 | Davis et al. |
| 2009/0228946 A1 | 9/2009 | Perlman et al. |
| 2009/0234938 A1 | 9/2009 | Amsterdam et al. |
| 2009/0234940 A1 | 9/2009 | Pal et al. |
| 2009/0238267 A1 | 9/2009 | Li et al. |
| 2009/0238405 A1 | 9/2009 | Buznach |
| 2009/0239666 A1 | 9/2009 | Hall et al. |
| 2009/0245373 A1 | 10/2009 | Tourapis et al. |
| 2009/0247295 A1 | 10/2009 | Weldon et al. |
| 2009/0257668 A1 | 10/2009 | Ye et al. |
| 2009/0264202 A1 | 10/2009 | Chen et al. |
| 2009/0268821 A1 | 10/2009 | Au et al. |

(56) References Cited

U.S. PATENT DOCUMENTS

| | | | |
|---|---|---|---|
| 2009/0275414 A1* | 11/2009 | Lee et al. .................. | 463/42 |
| 2009/0276402 A1 | 11/2009 | Stiers | |
| 2009/0278842 A1 | 11/2009 | Peterfreund | |
| 2009/0280908 A1 | 11/2009 | Carroll et al. | |
| 2009/0289945 A1 | 11/2009 | Peterfreund et al. | |
| 2009/0305790 A1 | 12/2009 | Lu et al. | |
| 2009/0307367 A1 | 12/2009 | Gigliotti | |
| 2009/0320051 A1* | 12/2009 | Meerwald et al. ........... | 719/328 |
| 2009/0322784 A1 | 12/2009 | Sartori | |
| 2010/0005503 A1 | 1/2010 | Kaylor et al. | |
| 2010/0014825 A1 | 1/2010 | Curtis et al. | |
| 2010/0017439 A1 | 1/2010 | Chen et al. | |
| 2010/0023640 A1 | 1/2010 | Vinson et al. | |
| 2010/0023977 A1 | 1/2010 | Peterfreund | |
| 2010/0035672 A1 | 2/2010 | Root | |
| 2010/0045662 A1 | 2/2010 | Boothroyd et al. | |
| 2010/0057939 A1 | 3/2010 | Zhang et al. | |
| 2010/0061443 A1 | 3/2010 | Maman et al. | |
| 2010/0064000 A1 | 3/2010 | Stroffolino | |
| 2010/0079676 A1 | 4/2010 | Kritt et al. | |
| 2010/0086023 A1 | 4/2010 | Cheung et al. | |
| 2010/0104021 A1 | 4/2010 | Schmit | |
| 2010/0124279 A1 | 5/2010 | Reddy et al. | |
| 2010/0125455 A1 | 5/2010 | Wang et al. | |
| 2010/0131776 A1 | 5/2010 | Ayars et al. | |
| 2010/0131994 A1 | 5/2010 | O'Brien | |
| 2010/0150525 A1 | 6/2010 | Walker | |
| 2010/0158101 A1 | 6/2010 | Wu et al. | |
| 2010/0161825 A1 | 6/2010 | Ronca et al. | |
| 2010/0166054 A1 | 7/2010 | Wirick | |
| 2010/0166056 A1 | 7/2010 | Perlman et al. | |
| 2010/0166058 A1 | 7/2010 | Perlman et al. | |
| 2010/0166062 A1 | 7/2010 | Perlman et al. | |
| 2010/0166063 A1 | 7/2010 | Perlman et al. | |
| 2010/0166064 A1 | 7/2010 | Perlman et al. | |
| 2010/0166065 A1 | 7/2010 | Perlman et al. | |
| 2010/0166066 A1 | 7/2010 | Perlman et al. | |
| 2010/0166068 A1 | 7/2010 | Perlman et al. | |
| 2010/0167809 A1* | 7/2010 | Perlman et al. ............. | 463/24 |
| 2010/0167816 A1 | 7/2010 | Perlman et al. | |
| 2010/0167823 A1 | 7/2010 | Winkler | |
| 2010/0169502 A1 | 7/2010 | Knowlson et al. | |
| 2010/0172309 A1 | 7/2010 | Forenza et al. | |
| 2010/0172358 A1 | 7/2010 | Zuberi et al. | |
| 2010/0172540 A1 | 7/2010 | Davis et al. | |
| 2010/0178035 A1 | 7/2010 | Xie | |
| 2010/0178986 A1 | 7/2010 | Davis et al. | |
| 2010/0185448 A1 | 7/2010 | Meisel | |
| 2010/0195977 A1 | 8/2010 | Bennett et al. | |
| 2010/0205023 A1 | 8/2010 | Wagner | |
| 2010/0214301 A1 | 8/2010 | Li et al. | |
| 2010/0227690 A1 | 9/2010 | Brunet de Courssou et al. | |
| 2010/0248817 A1 | 9/2010 | Anderson | |
| 2010/0317443 A1 | 12/2010 | Cook et al. | |
| 2011/0107220 A1 | 5/2011 | Perlman | |
| 2011/0122063 A1 | 5/2011 | Perlman et al. | |
| 2011/0290883 A1* | 12/2011 | Kotlarsky et al. ....... | 235/462.11 |
| 2012/0004039 A1 | 1/2012 | Perry et al. | |
| 2012/0004040 A1 | 1/2012 | Pereira et al. | |
| 2012/0004041 A1 | 1/2012 | Pereira et al. | |
| 2012/0004042 A1 | 1/2012 | Perry et al. | |
| 2012/0064975 A1 | 3/2012 | Gault et al. | |
| 2012/0064976 A1 | 3/2012 | Gault et al. | |
| 2012/0172124 A1 | 7/2012 | Estrop et al. | |
| 2012/0200583 A1 | 8/2012 | Clemie et al. ............... | 345/522 |

FOREIGN PATENT DOCUMENTS

| | | |
|---|---|---|
| KR | 20020086835 A | 11/2002 |
| KR | 10-2005-111581 | 11/2005 |
| WO | WO 9814898 | 4/1998 |
| WO | WO 0242921 A1 | 5/2002 |
| WO | WO 02060183 A1 | 8/2002 |
| WO | WO 02103996 A2 | 12/2002 |
| WO | WO 2003075116 | 4/2003 |
| WO | WO 03047710 A2 | 6/2003 |
| WO | WO 2003047710 A3 | 6/2003 |
| WO | WO 03/075116 | 9/2003 |
| WO | WO 03075116 A2 | 9/2003 |
| WO | WO 2004018060 A3 | 3/2004 |
| WO | WO 2006011153 A2 | 2/2006 |
| WO | WO 2007130012 A1 | 11/2007 |
| WO | 2009073792 A1 | 6/2009 |
| WO | 2009073795 A1 | 6/2009 |
| WO | 2009073796 A1 | 6/2009 |
| WO | 2009073797 A1 | 6/2009 |
| WO | 2009073798 A1 | 6/2009 |
| WO | 2009073799 A1 | 6/2009 |
| WO | 2009073800 A1 | 6/2009 |
| WO | 2009073801 A1 | 6/2009 |
| WO | 2009073802 A1 | 6/2009 |
| WO | 2009073819 A1 | 6/2009 |
| WO | 2009073823 A1 | 6/2009 |
| WO | 2009073824 A1 | 6/2009 |
| WO | 2009073825 A1 | 6/2009 |
| WO | 2009073826 A1 | 6/2009 |
| WO | WO 2009073827 A1 | 6/2009 |
| WO | WO 2009073828 A1 | 6/2009 |
| WO | WO 2009073830 A1 | 6/2009 |
| WO | WO 2009073831 A1 | 6/2009 |
| WO | WO 2009073832 A1 | 6/2009 |
| WO | WO 2009073833 A1 | 6/2009 |
| WO | WO 2009076172 A2 | 6/2009 |
| WO | WO 2009076177 A1 | 6/2009 |
| WO | WO 2009076178 A1 | 6/2009 |

OTHER PUBLICATIONS

U.S. Appl. No. 12/826,489 Non-Final Office Action dated Mar. 6, 2012.

Bangun, Ricky A., et al., A Network Architecture for Multiuser Networked Games on Demand, International Conference on Information, Cummunications and Signal Processing, ICICS '97, pp. 1815-1819, Sep. 9-12, 1997.

BostonFUG April Writeup: Chris Allen on Brassmonkey Wifi Game Controller, Ira's website, pp. 1-2, Apr. 13, 2010, http://irahochman.com/content/bostonfug-april-writeup-chris-allen-brassmonkey-wifi-game-controller.

Buck, Ian et al., Tracking Graphics State for Networked Rendering, Stanford University, Proc., SIGGRAPH/EUROGRAPHICSWorkshop on Graphics Hardware, 2000.

Clouds Without Stitches from End to End: The Ten Unique Runaware Cloud Advantages, Runaware White Paper, vol. Two, pp. 1-11 Jun. 2010.

Cronin, Eric, et al., A Distributed Multiplayer Game Server System, Electrical Engineering and Computer Science Department, University of Michigan, May 4, 2001.

Diot, Christophe, et al., A Distributed Architecture for Multiplayer Interactive Applications on the Internet, IEEE Network, pp. 6-15, Jul./Aug. 1999.

Dripps's, Jeff, Profile, pp. 1-2.

Gautier, Laurent, et al., Design and Evaluation of MiMaze, a Multi-Player Game on the Internet, A-188, pp. 1-15.

G-Cluster E3 2001—Play Harder.

G-Cluster gears up for US launch, Trey Walker, GameSpot, Posted Nov. 20, 2001, The wireless gaming network developer shows off its proprietary technology. pp. 1-3, http://uk.gamespot.com/news/2826174.html.

G-cluster, Game System for Broadband Neworks, Copyright 2002, G-cluster Ltd.

Hossain, AZM Ekram, et al., End-System Architecture for Distributed Networked Multimedia Applications: Issues, Trends and Future Directions, IEEE, pp. 452-455, 1999.

Hotel Room—Streaming Games, LodgeNet. http://www.youtube.com/watch?v=QR3mVSOlky8.

Humphreys, et al., Chromium: A Stream-Processing Framework for Interactive Rendering on Clusters, Proc. International Conference on Computer Graphics and Interactive Techniques, 2002.

Humphreys, et al., Distributed Rendering for Scalable Displays, IEEE Supercomputing 2000, Oct. 2000.

(56) References Cited

OTHER PUBLICATIONS

In-Flight Entertainment—Streaming Games—Panasonic's System 2000E. http://panasonic.aero/AboutUs/ProductHistory.aspx.
Jurgelionis, A., et al., Platform for Distributed 3D Gaming, International Journal of Computer Games Technology, vol. 2009, Article ID 231863, 15 pages, doi: 10.1155/2009/231863.
Kraetel IP-STB brings advanced gaming to TV sets together with Thirdspace and G-cluster, pp. 1-2, Sep. 5, 2002, http://www.gamecluster.com/kraetel.htm.
Levoy, Marc, Polygon-Assisted JPEG and MPEG Compression of Synthetic Images, Stanford University, pp. 21-28.
Lui, John C.S., et al., An Efficient Partitioning Algorithm for Distributed Virtual Environment Systems, IEEE, pp. 193-211, 2002.
MacKenzie, I. Scott, et al., Lag as a Determinant of Human Performance in Interactive Systems, INTERCHI '93, Apr. 24-29, 1993, pp. 488-493.
Nieh, Jason, et al., Measuring Thin-client Performance Using Slow-Motion Benchmarking, ACM Transactions on Computer Systems, vol. 21, No. 1, Feb. 2003, pp. 87-115.
Pantel, Lothar et al., On the Impact of Delay on Real-Time Multiplayer Games, NOSSDAV '02, May 12-14, 2002, Miami, Florida, pp. 23-29.
Park, Jaeyong, et al., Development of a Multiuser & Multimedia Game Engine Based on TCP/IP*, IEEE, 1997.
PCT/2011/51468 International Search Report and Written Opinion, dated Feb. 1, 2012.
PCT/IL98/00267, International Search Report, dated Sep. 30, 1998.
PCT/US01/41892, International Search Report, dated Dec. 17, 2001.
PCT/US06/39093, International Search Report, dated Feb. 28, 2007.
PCT/US07/13468, International Search Report, dated Mar. 3, 2008.
PCT/US07/17188, International Search Report, dated May 29, 2008.
PCT/US08/73780, International Search Report, dated Nov. 10, 2008.
PCT/US08/85556, International Search Report, dated Dec. 18, 2008.
PCT/US08/85558, International Search Report, dated Dec. 31, 2008.
PCT/US08/85595, International Search Report, dated Jan. 16, 2009.
PCT/US08/85601, International Search Report, dated Jan. 9, 2009.
PCT/US08/85603, International Search Report, dated Jan. 12, 2009.
PCT/US08/85605, International Search Report, dated Jan. 23, 2009.
PCT/US2008/085545, International Search Report, dated Jan. 23, 2009.
PCT/US2008/085546, International Search Report, dated Jan. 14, 2009.
PCT/US2008/085549, International Search Report, dated Jan. 23, 2009.
PCT/US2008/085550, International Search Report, dated Jan. 20, 2009.
PCT/US2008/085551, International Search Report, dated Jan. 21, 2009.
PCT/US2008/085554, International Search Report, dated Jan. 21, 2009.
PCT/US2008/085593, International Search Report, dated Jan. 21, 2009.
PCT/US2008/085598, International Search Report, dated Jan. 16, 2009.
PCT/US2008/085599, International Search Report, dated Jan. 21, 2009.
PCT/US2008/085600, International Search Report, dated Jan. 22, 2009.
PCT/US2008/085602, International Search Report, dated Jan. 13, 2009.
PCT/US2008/085606, International Search Report, dated Jan. 21, 2009.
PCT/US2008/085608, International Search Report, dated Jan. 20, 2009.
PCT/US2008/085609, International Search Report, dated Jan. 21, 2009.
PCT/US2008/085610, International Search Report, dated Jan. 21, 2009.
PCT/US2008/85560, International Search Report, dated Jan. 14, 2009.
PCT/US2010/036936 International Preliminary Report on Patentability, dated Dec. 15, 2011.
PCT/US2010/036936, International Search Report and Written Opinion, dated Aug. 2, 2010.
PCT/US2010/036977 International Preliminary Report on Patentability, dated Dec. 15, 2011.
PCT/US2010/036977, International Search Report and Written Opinion, dated Aug. 2, 2010.
PCT/US2011/051461 nternational Search Report and Written Opinion, dated Apr. 9, 2012.
PCT/US2011/051461, International Search Report and Written Opinion, dated Apr. 9, 2012.
Proceedings of the 2002 USENIX Annual Technical Conference, Monterey, California, USA, Jun. 10-15, 2002.
TESTDRIVE, Runaware, Inc., pp. 1-2.
Try Before you Buy: Why Runaware TestDrive is a Great, Low Cost First Step into the Clouds, Runaware White Paper, vol. One, pp. 1-11, Jun. 2010.
U.S. Appl. No. 11/499,524, filed Aug. 3, 2006 (Perry)—Final Office Action dated Sep. 14, 2011.
U.S. Appl. No. 12/334,819, David Perry, Non-Final Office Action dated Jul. 27, 2011.
Wu, Tsong-Ho, et al., Distributed Interactive Video System Design and Analysis, IEEE, pp. 100-108, Mar. 1997.
Unknown, "T5 Labs Reveals Instant Gaming Platform", Article Nov. 9, 2007, p. 1-8, http://www.edge-online.com.
Parfitt, "Pay for Play" gaming a reality—Article Nov. 20. 2007, p. 1-7, http://www.mcvuk.com.
Schramm, "Onlive calls T5 Labs claim to key game streaming patent irrelevant"—Article Feb. 15, 2011, VentureBeat.
Takahashi, "Who invented cloud gaming? T5 Labs tangles with Onlive"—Article Feb. 15, 2011, p. 1-4, venturebeat.com.
Onlive Fans blog—Blog Feb. 17, 2011, p. 1-8, http://onlivefans.com.
Unknown, "New Virtual Game Console From T5 Labs Makes PC Games Playable on Televisions"—Article Nov. 12, 2011, PR Newswire UK, http://www.prnewswire.co.uk.
PCT/US2011/051461—International Search Report and Written Opinion, dated Apr. 9, 2012.
U.S. Appl. No. 11/499,254, Perry, Online Game Customer Lead Generation, filed Aug. 3, 2006.
U.S. Appl. No. 12/966,145, Pereira, Audio Deceleration, filed Dec. 13, 2010.
U.S. Appl. No. 12/791,819, Perry, Qualified Video Delivery, filed Jun. 1, 2010.
U.S. Appl. No. 13/109,932, Perry, Qualified Video Delivery Methods, filed May 17, 2011.
U.S. Appl. No. 12/826,130, Gault, Video Game Overlay, filed Jun. 29, 2010.
U.S. Appl. No. 12/966,103, Pereira, Audio Acceleration, filed Dec. 13, 2010.
U.S. Appl. No. 12/826,489, Pereira, Voice Overlay, filed Jun. 29, 2010.
U.S. Appl. No. 12/790,98, Pereira, Bufferless H.264 Variant, filed May 31, 2010.
U.S. Appl. No. 12/790,955, Gault, Game Execution Environments, filed May 31, 2010.
U.S. Appl. No. 11/499,524, Perry, Online Game Customer Lead Generation, filed Aug. 3, 2006.
PCT/US10/36936, Pereira, Game Execution Environments, filed Jun. 1, 2010.
PCT/US10/36977, Perry, Qualified Video Delivery, filed Jun. 1, 2010.
U.S. Appl. No. 13/231,850, Pereira, Program Mode Switching, filed Sep. 13, 2011.
U.S. Appl. No. 13/231,790, Perry, Dual-Mode Program Execution, filed Sep. 13, 2011.

(56) References Cited

OTHER PUBLICATIONS

U.S. Appl. No. 13/231,873, Perry, Intelligent Game Loading, filed Sep. 13, 2011.
U.S. Appl. No. 13/231,883, Gault, Add-on Management Methods, filed Sep. 13, 2011.
U.S. Appl. No. 13/231,862, Pereira, Program Mode Transition, filed Sep. 13, 2011.
U.S. Appl. No. 13/231,810, Perry, Dual-Mode Program Execution, filed Sep. 13, 2011.
PCT/US11/051468, Gault, Dual-Mode Program Execution and Loading, filed Sep. 13, 2011.
PCT/US11/051461, Pereira, Add-On Management, filed Sep. 13, 2011.
U.S. Appl. No. 13/350,216, Gault, Command Sentinel, filed Jan. 13, 2012.
Decision of Rejection from the Korean Intellectual Property Office (KIPO), dated Dec. 1, 2016.

* cited by examiner

ADD-ON MANAGEMENT SYSTEMS

CROSS-REFERENCE TO RELATED APPLICATIONS

This application claims benefit of and priority to U.S. Provisional Patent Application Ser. No. 61/382,470 entitled "Add-on Management" and filed Sep. 13, 2010. This application is related to U.S. patent application Ser. No. 12/826,130 filed Jun. 29, 2010 and entitled "Video Game Overlay," and U.S. patent application Ser. No. 12/826,489 filed Jun. 29, 2010 and entitled "Voice Overlay." The disclosures of all the above commonly owned patent applications are hereby incorporated herein by reference.

BACKGROUND

Field of the Invention

The invention is in the field of computer systems and specifically in the field of server side execution of computer programs.

Related Art

Add-ons are sets of computing instructions that are used to extend the functionality of or otherwise augment a computer program. Add-ons are used in a wide variety of applications. For example, an Adobe Reader® add-on may be used to enable Microsoft word to print to a .pdf file, or to enable a browser to view .pdf files. Add-ons are popular in on-line video games. For example, the popular multi-player on-line game World of Warcraft® has available hundreds of add-ons that can be used to enhance game play. These add-ons are typically provided by third parties. To add an add-on to a computer program a user downloads the add-on from a website and installs the add-on in an appropriate directory on the user's computer. As used herein, the term "add-on" is used to refer to optional computing instructions configured to extend the functionality of a computer program, where the add-on is developed specifically for the computer program. An add-on may be developed by a third-party or by the developer of the computer program. Some computer programs are configured to look for add-ons in specific directories. Add-ons are distinguished from other software utilities, such as printer drivers, in that they are configured to augment a specific program. Add-ons are sometimes referred to as "plug-ins."

Add-on data is data included with, generated or organized by an add-on. For example, in a video game add-on data may include the locations of objects within a game, inventory information, records of purchases and sales, auction house data, characteristics of non-player characters, maps, historically information, audio data, event timing information, and/or the like.

Computer programs often include computing instructions or an application programming interface (API) configured for communication between the computer program and an add-on. For example, it is common for a computer program to be configured to look in a specific directory for add-ons. This directory can be a subdirectory of a directory in which the computer program is stored.

SUMMARY

Some embodiments of the invention include systems and methods of using add-ons in systems where a computer program is executed on a server and streaming video generated as a result of the program's execution is provided to a remote client. The add-ons can be installed on the server or the client. If an add-on is installed on the client and the computer program on a server, then an application programming interface (API) is provided such that the computer program can operate as if the add-on was on the server local to the computer program. The API on the server is configured to pass communications between the add-on and the computer program over a communication network.

If the add-on is installed on the server, the computer program may be installed on either the client or a location geographically remote from the client. Various embodiments of the invention can include, for example, utilities configured for remotely installing add-ons, computing instructions configured to provide a virtual environment for execution of the add-on; storage of add-on data, turning add-ons on and off, executing add-ons securely, maintaining an approved add-on list; and/or the like.

Various embodiments of the invention include game server system comprising a video source configured to use game logic to generate video frames and to encode the video frames to a video stream, the video stream being based on a game environment of a video game, the game logic being augmented by an add-on; an I/O device configured to communicate the video stream to a geographically remote client and to receive game commands from the client; add-on storage configured to store the add-on in a location accessible to the video game, and to store add-on data of the add-on in a location accessible to the add-on; an add-on manager configured to create an add-on environment configured for use of the add-on by the video game, associate the add-on with a user account, and associate the add-on data of the add-on with the user account; and a processor configured to execute the game logic or the add-on manager.

Various embodiments of the invention include a system comprising a video source configured to use game logic to generate video frames and to encode the video frames to a video stream, the video stream being based on a state of a video game and game commands received from a geographically remote client, the game logic being augmented by an add-on; an I/O device configured to communicate the video stream to the geographically remote client and to receive the game commands from the client; an add-on manager configured to automatically update the add-on in response to receiving a new version of the game logic; and a processor configured to execute the game logic or the add-on manager.

Various embodiments of the invention include a system comprising game logic installed on a first computing device and configured to generate video frames and to present the video frames on a display; an first API filter installed on the first computing device and configured to redirect commands between the game logic and an add-on, the add-on being installed on a second computing device geographically remote from the first computing device and being configured to augment the functionality of the game logic; an I/O device configured to communicate the commands between the first computing device and the second computing device; and a processor configured to execute the game logic.

Various embodiments of the invention include method of executing an add-on, the method comprising installing the add-on on a game server system configured to provided a video stream to a client, the video stream being a result of execution of game logic whose functionality the add-on is configured to extend, the client being geographically remote from the game server system; executing the game logic; receiving a game command from the client at the game logic; passing the received game command from the game logic to the add-on; generating add-on data using the add-on;

and storing the add-on data in a location geographically remote from the client, the add-on data being associated with an account of a user of the client.

Various embodiments of the invention include method of installing an add-on, the method comprising identifying the add-on to be installed; establish an add-on environment configured for the add-on to be accessed by a computer program, the computer program being executed using a client and being located on a server geographically remote from the client; placing the add-on in the add-on environment; associating the add-on with an account of a user of the client; identifying storage for add-on data generated by the add-on; and associating the storage or the add-on data with the account.

Various embodiments of the invention include method of automatically updating an add-on, the method comprising receiving an updated version of a game logic at a video source, the video source being configured to generate a video stream based on game commands received from a geographically remote client and to provide the video stream to the remote client; determining that an add-on is used to augment functionality of the game logic; sending a request for an updated version of the add-on to a third party, the request including an identity of the add-on and an address to which the update should be provided; receiving the updated version of the add-on via a computing network, the updated version of the add-on being configured to augment the updated version of the game logic; and automatically installing the add-on in an add-on environment configured for the add-on to be used by the game logic.

BRIEF DESCRIPTIONS OF THE DRAWINGS

DETAILED DESCRIPTION

Systems in which a computer program is executed on a server and a video stream output of the computer program is provided to a geographically remote client are disclosed in the commonly owned patent applications cited above. Various embodiments of the invention provide an ability to use add-ons in these systems. The add-ons are installed, executed, supported and otherwise managed by an add-on manager that can be located at the server, the client or some other location. For example, the add-on manager may be used to install an add-on within an appropriate environment of the server such that it can be accessed through an API of the computer program. Add-on data generated by the add-on and the add-on itself are typically associated with a specific, client, user account, avatar, and/or the like. In other embodiments of the invention the computer program but not the add-on is installed on the client.

Figure 1:
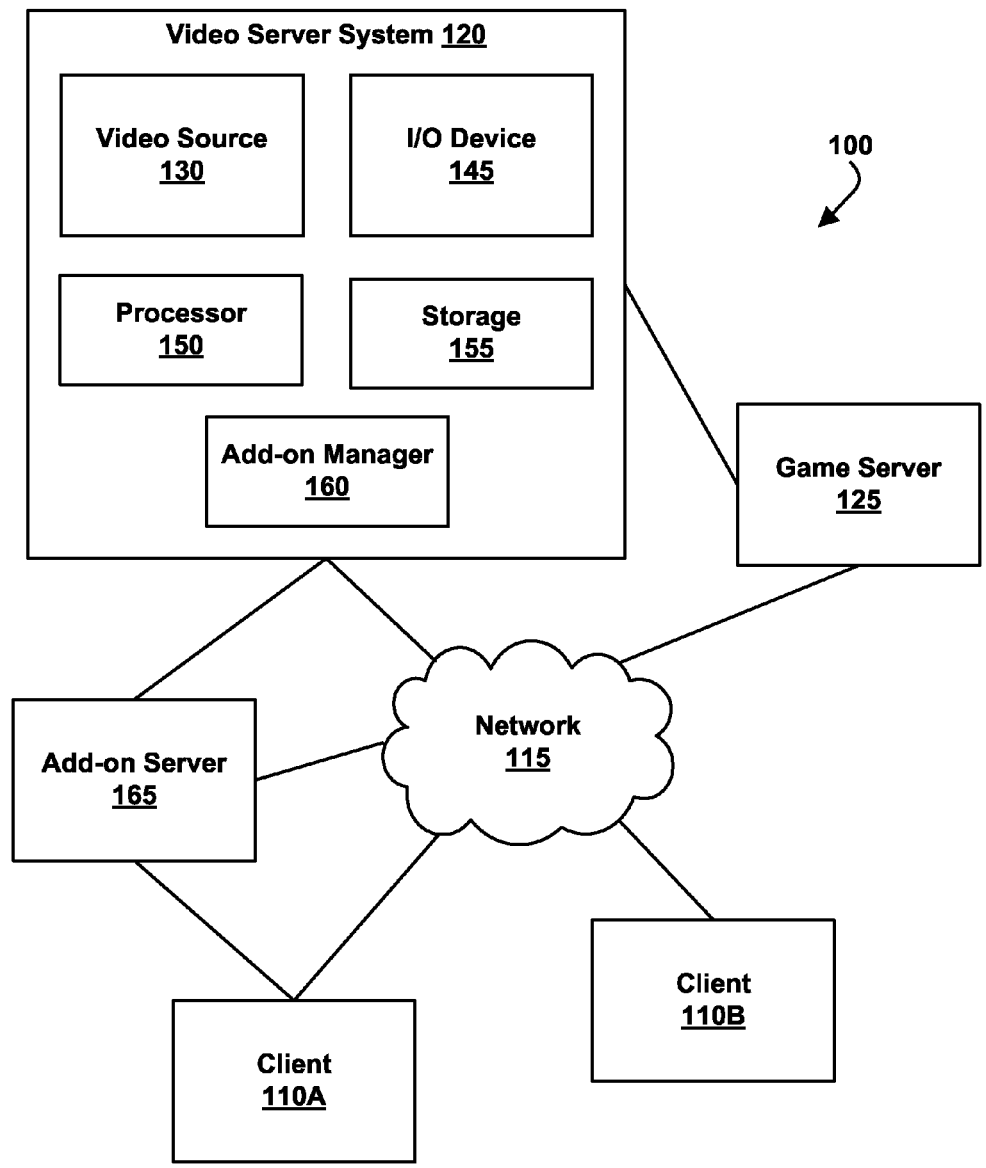
FIG. 1 illustrates a system configured to execute a computer program augmented by one or more add-ons, according to various embodiments of the invention.

FIG. 1 illustrates a Game System 100 configured to execute a computer program augmented by one or more add-ons, according to various embodiments of the invention. Game System 100 is configured to provide a video stream to one or more Clients 110 via a Network 115. Game System 100 typically includes a Video Server System 120 and an optional Game Server 125. Video Server System 120 is configured to provide the video stream to the one or more Clients 110 with a minimal quality of service. For example, Video Server System 120 may receive a game command that changes the state of, or a point of view within, a video game, and provide Clients 110 with an updated video stream reflecting this change in state with minimal latency. The Video Server System 120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second, although higher or lower frame rates are included in alternative embodiments of the invention. In some embodiments, Video Server System 120 is configured to provide three dimensional video data. E.g. matched video streams rendered from points of view separated by the distance between a person's eyes.

Clients 110, referred to herein individually as 110A, 110B, etc., may include terminals, personal computers, game consoles, tablet computers, telephones, televisions, set top boxes, kiosks, wireless devices, digital pads, stand-alone devices, handheld game playing devices, and/or the like. Typically, Clients 110 are configured to receive encoded video streams, decode the video streams, and present the resulting video to a user, e.g., a player of a game. The processes of receiving encoded video streams and/or decoding the video streams optionally includes storing individual video frames in a receive buffer of the client. The video streams may be presented to the user on a display integral to Client 110 or on a separate device such as a monitor or television. Clients 110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 110 are optionally geographically dispersed. The number of clients included in Game System 100 may vary widely from one or two to thousands, tens of thousands, or more. As used herein, the term "game player" is used to refer to a person that plays a game and the term "game playing device" is used to refer to a device used to play a game.

Clients 110 are configured to receive video streams via Network 115. Network 115 may be any type of communication network between computing devices including, a telephone network, the Internet, wireless networks, powerline networks, local area networks, wide area networks, private networks, and/or the like. Network 115 explicitly does not include communication channels completely within a computing device, such as a motherboard bus. In typical embodiments, the video streams are communicated via standard protocols, such as TCP/IP or UDP/IP. Alternatively, the video streams are communicated via proprietary standards.

A typical example of Clients 110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 110 may, but are not required to, further include systems configured for modifying received video. For example, a client may be configured to perform further rendering, to overlay one video image on another video image, to crop a video image, and/or the like. Clients 110 may be configured to receive various types of video frames, such as I-frames, P-frames and B-frames, and to process these frames into images for display to a user. In some embodiments, a member of Clients 110 is configured to perform further rendering, shading, conversion to 3-D, or like operations on the video stream. A member of Clients 110 is optionally configured to receive more than one audio or video stream. Input devices of Clients 110 may include, for example, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 110 is generated and provided by Video Server System 120. As is described further elsewhere herein, this video stream includes video frames (and the audio stream includes audio frames). The video frames are configured (e.g., they include pixel information in an appropriate data structure) to contribute meaningfully to the images displayed to the user. A meaningful contribution is a contribution that is readily observable by a game player. As used herein, the term "video frames" is used to refer to frames including predominantly information that is configured to contribute to, e.g. to effect, the images shown to the user. Most of the teachings herein with regard to "video frames" can also be applied to "audio frames." Clients 110 may be configured to receive more than one video stream at the same time. For example, Client 110B may be configured to receive a matched pair of video streams configured to form a three dimensional image when one of the streams is presented to one eye and the other stream is presented to the other eye.

Clients 110 are typically configured to receive inputs from a user. These inputs may include game commands configured to change the state of the video game or otherwise affect game play. The game commands can be received using input devices and/or may be automatically generated by computing instructions executing on Clients 110. The received game commands are communicated from Clients 110 via Network 115 to Video Server System 120 and/or Game Server 125. For example, in some embodiments, the game commands are communicated to Game Server 125 via Video Server System 120. In some embodiments, separate copies of the game commands are communicated from Clients 110 to Game Server 125 and Video Server System 120. The communication of game commands is optionally dependent on the identity of the command. Game commands are optionally communicated from Client 110A through a different route or communication channel that that used to provide audio or video streams to Client 110A.

In various embodiments, Clients 110 are configured to communicate add-on data between each of Client 100 and Video Server System 120, or between different members of Clients 110. For example, an add-on that enables voice communication directly between clients can include the communication of audio data between clients. Add-on data that augments the functionality of a server side computer program may be stored on one of Clients 110 for use by a server side add-on or for use by a client side add-on. Add-on data may also be stored on Video Server System 120 or on Add-on Server 165, and be used by add-ons located on one of Clients 110, Video Server System 120 or Add-on Server 165.

Game Server 125 is optionally operated by a different entity than Video Server System 120. For example, Game Server 125 may be operated by the publisher of a multi-player game. In this example, Video Server System 120 is optionally viewed as a client by Game Server 125 and optionally configured to appear from the point of view of Game Server 125 to be a prior art client executing a prior art game engine. Communication between Video Server System 120 and Game Server 125 can occur via Network 115. As such, Game Server 125 can be a prior art multiplayer game server that sends game state information to multiple clients, one of which is Video Server System 120. Video Server System 120 may be configured to communicate with multiple instances of Game Server 125 at the same time. For example, Video Server System 120 can be configured to provide a plurality of different video games to different users. Each of these different video games may be supported by a different Game Server 125 and/or published by different entities. In some embodiments, several geographically distributed instances of Video Server System 120 are configured to provide game video to a plurality of different users. Each of these instances of Video Server System 120 may be in communication with the same instance of Game Server 125. Communication between Video Server System 120 and one or more Game Server 125 optionally occurs via a dedicated communication channel. For example, Video Server System 120 may be connected to Game Server 125 via a high bandwidth channel that is dedicated to communication between these two systems.

Video Server System 120 comprises at least a Video Source 130, an I/O Device 145, a Processor 150, and non-transitory Storage 155. Video Server System 120 may consist of one computing device or be distributed among a plurality of computing devices. These computing devices are optionally connected via a communications system such as a local area network.

Video Source 130 is configured to provide a video stream, e.g., streaming video or a series of video frames that form a moving picture. In some embodiments Video Source 130 is also configured to provide an audio stream. In some embodiments, Video Source 130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 125. Game Server 125 may maintain a copy of the state of the game based on game commands received from multiple players using geographically disperse clients. In these cases, the game state is provided by Game Server 125 to Video Source 130, wherein a copy of the game state is stored and rendering is performed. Game Server 125 may receive game commands directly from Clients 110 via Network 115, and/or may receive game commands via Video Server System 120.

Video Source 130 typically includes rendering logic, e.g., hardware, firmware, and/or software stored on a computer readable medium such as Storage 155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720 p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 130 includes a video recording device such as a camera. This camera may be used to generate delayed or live video that can be included in the video stream of a computer game. The resulting video stream, optionally includes both rendered images and images recorded using a still or video camera. Video Source 130 may also include storage devices configured to store previously recorded video to be included in a video stream. Video Source 130 may also include motion or positioning sensing devices configured to detect motion or position of an object, e.g., person, and logic configured to determine a game state or produce video-based on the detected motion and/or position.

Video Source 130 is optionally configured to provide overlays configured to be placed on other video. For example, these overlays may include a command interface, login instructions, video frames rendered from another game player's point of view, messages to a game player, images of other game players, video feeds of other game players (e.g., webcam video). In embodiments of Client 110A that include a touch screen interface, the overlay may include a virtual keyboard, joystick, touch pad, and/or the like. In one example of an overlay a player's voice is overlaid on an audio stream. Video Source 130 optionally further includes one or more audio sources.

In embodiments wherein Video Server System 120 is configured to maintain the game state based on input from more than one player, each player may have a different point of view comprising a position and direction of view. Video Source 130 is optionally configured to provide a separate video stream for each player based on their point of view. Further, Video Source 130 may be configured to provide a different frame size, frame data size, and/or encoding to each of Client 110. Video Source 130 is optionally configured to provide 3-D video.

I/O Device 145 is configured for Video Server System 120 to send and/or receive information such as video, commands, add-ons, add-on data, requests for information, a game state, client identities, player identities, game commands, security information, audio data, and/or the like. I/O Device 145 typically includes communication hardware such as a network card or modem. I/O Device 145 is configured to communicate with Game Server 125, Network 115, and/or Clients 110. I/O Device 145 is configured to receive the information from more than one of Clients 110. I/O Device 145 is optionally configured to receive the information as packets using a standard such as TCP or UDP.

Processor 150 is configured to execute logic, e.g. software, included within the various components of Video Server System 120 discussed herein. For example, Processor 150 may be programmed with software instructions in order to perform the functions of Video Source 130, Game Server 125, and/or an Add-on Manager 160. Video Server System 120 optionally includes more than one instance of Processor 150. Processor 150 may also be programmed with software instructions in order to execute commands received by Video Server System 120, or to coordinate the operation of the various elements of Game System 100 discussed herein. Processor 150 may include one or more hardware device. Processor 150 is an electronic processor.

Storage 155 includes non-transitory analog and/or digital storage devices. For example, Storage 155 may include an analog storage device configured to store video frames. Storage 155 may include a computer readable digital storage, e.g. a hard drive, an optical drive, or solid state storage. Storage 115 is configured (e.g. by way of an appropriate data structure or file system) to store video frames, artificial frames, a video stream including both video frames and artificial frames, audio frame, an audio stream, add-ons, add-on data, and/or the like. Storage 155 is optionally distributed among a plurality of devices. In some embodiments, Storage 155 is configured to store the software components of Video Source 130 discussed elsewhere herein. These components may be stored in a format ready to be provisioned when needed.

Video Server System 120 optionally further comprises Add-on Manager 160. Add-on Manager 160 is configured to facilitate the use of add-ons to augment computer programs on Video Server System 120 and/or Clients 110. For example, in some embodiments, Add-on Manager 160 is configured to augment a game program within Video Source 130. In some embodiments, Add-on Manager 160 is configured to augment a game program within Clients 110.

Tasks that may be performed by Add-on Manager 160 include, but are not limited to, installing an add-on, updating an add-on, executing an add-on, storing add-on data, and communicating add-on data. In some embodiments, Add-on Manager 160 includes computing instructions configured for redirecting communications between an add-on and the associated computer program. Add-on Manager 160 may redirect messages from the computer program, originally directed toward a specific location relative to the computer program, to an alternative location. For example, if the computer program included within Video Source 130 is configured to access add-ons and/or add-on data in a specific directory relative to the computer program, Add-on Manager 160 may be configured to redirect that access to a different location within Video Server System 120, to one of Clients 110, or to a separate Add-on Server 165. The specific directory in which the computer program is configured to access add-ons may be a subdirectory of a directory in which the computer program is executed. The location to which access is redirected is optionally a virtual environment. Alternatively, if the computer program is within Client 110B and is configured to access add-ons within a specific directory of Client 110B, then Add-on manager may be configured to redirect this access to a location within Video Server System 120 and/or Add-on Server 165. As such, an add-on on Client 110B can be used to augment a computer program on Video Server System 120, or vice versa. Likewise, an add-on on Add-on Server 165 can be used to augment a computer program on either Clients 110 or Video Server System 120. A virtual environment is an environment in which some location or physical device, such as a storage location or path, is simulated using software.

Add-on Manager 160 includes hardware, firmware, and/or software stored on a computer readable medium. All or part of Add-on Manager 160 is optionally disposed on a computing device separate from one or more other elements of Video Server System 120. For example, all or part of Add-on Manager 160 is optionally disposed on Clients 110, Add-on Server 165, or at some other location within Game System 100. Further details of Add-on Manager 160 are discussed elsewhere herein.

Optional Add-on Server 165 is a system configured for storage and/or execution of one or more add-ons. Add-on Server 165 may also be used to store add-on data. Communications between Add-on Server 165 and Video Server System 120 and/or Clients 110 can occur directly or through Network 115. Add-on Server 165 is optionally managed by the publisher or developer of an add-on. In some embodiments, communications from a computer program are redirected to a location of Add-on Server 165, from a location proximate to the computer program. For example, access to add-on data or an add-on executable may be redirected from Client 110B or Video Server System 120 to Add-on Server 165. Game System 100 may include more than one Video Server System 120 and/or more than one Add-on Server 165.

Add-on Server 165 includes hardware, firmware, and/or software stored on a computer readable medium. For example, in some embodiments Add-on Server 165 includes a computing device, digital storage, an electronic processor and I/O devices. The digital storage can include add-on executable code, add-on data, images, all or part of Add-on Manager 160, computing instructions configured to manage add-on's communication with other elements of Game System 100, and/or the like.

Figure 2:
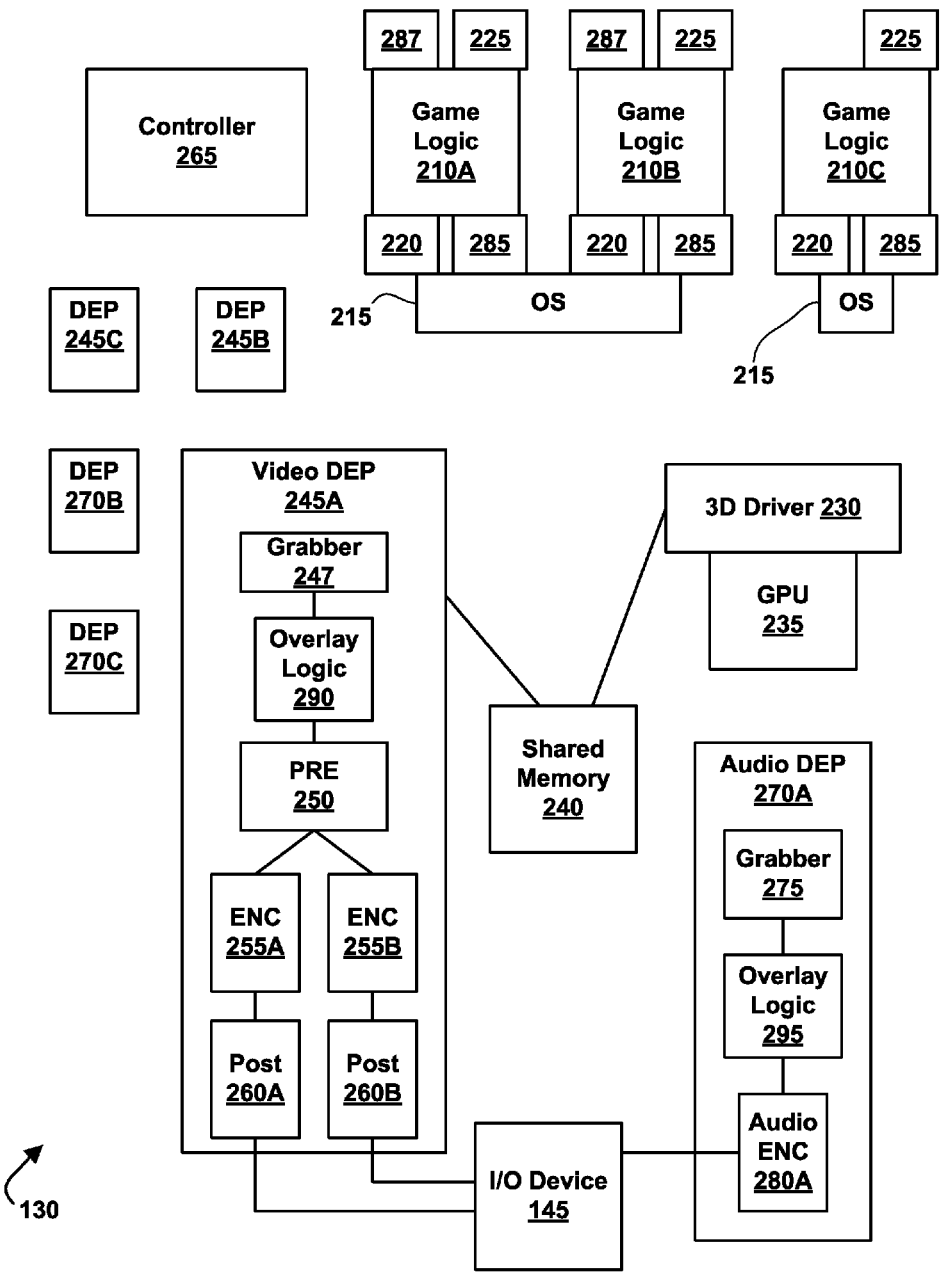
FIG. 2 is a block diagram of embodiments of a video source configured to serve multiple video games augmented by add-ons, according to various embodiments of the invention.

FIG. 2 is a block diagram of embodiments of Video Source 130 configured to serve multiple video games augmented by add-ons, according to various embodiments of the invention. The multiple video games can include multiple instances of the same video game and/or instances of different video games. The video games are optionally multiplayer games. For example, a game state of one or more of the video games may be maintained by one or more instances of Game Server 125 each based on inputs received from multiple clients. The elements of Video Source 130 illustrated in FIG. 2 are optionally executed using Processor 150.

The video games are executed using different instances of Game Logic 210, individually labeled 210A, 210B, 210C, etc. Game Logic 210 is configured to use a game state to determine a game environment that can be rendered to a video stream configured to be presented to a game player. The game environment is a two or three dimensional virtual environment including in-game objects, avatars, locations of objects, their shapes, textures, and spatial relationships there between, and the like. A game environment can include vertex data, transformation data and texture data, and/or the like.

The rendering of the game environment is typically based on one or more points of view associated with a specific game player. These points of view can be drastically different, such as an overhead view and a forward view. Or, the points of view can be from positions differing by approximately the distance between a person's pupils, and configured to create a 3D image. Video Source 130 may include more than 1, 2, 3, 5, 7, 15, or 31 instances of Game Logic 210. Game Logic 210 is optionally a client of Game Server 125 and may be configured to communicate with Game Server 125 via Network 115.

Game Logic 210 is configured to receive game commands from one or more of Clients 110 and to process the received commands according to a set of game rules. These rules cover, for example, how avatars interact with other avatars or in game objects, avatar movement, game instance management, and/or the like. Game Logic 210 is optionally also configured to generate audio data based on events within the game. This audio data may represent a gunshot, a splash, an engine, voice, flying, rain, music, or any other sound that could occur in a game. For example, an event such as one object hitting another may result in audio data representing a related sound. Game Logic 210 includes hardware, firmware, and/or software stored on a computer readable medium.

Each instance of Game Logic 210 can be disposed on a separate computing device or several instances of Game Logic 210 could be disposed on the same computing device or a single instance of Game Logic 210 could be disposed across multiple computing devices. Instances of Game Logic 210 can dynamically change the number and/or identify of computing devices used depending on the requirements of the game environment the user is currently experiencing. Instances of Game Logic 210 disposed on the same computing device are optionally executed within separate virtual machines or virtual I/O shells. In some embodiments, different instances of Game Logic 210 are configured to communicate game commands and/or game state information directly to each other, e.g., without necessarily communication through Game Server 125.

Game Logic 210 typically executes on top of an Operating System (OS) 215. Operating System 215 may include Windows™, Linux, Unix, Mac OS™, Solaris™, and/or the like. A virtual machine platform may operate between Operating System 215 and Game Logics 210. The virtual machine platform can include commercial systems such as ESX, Hyper-V, and/or the like. In these embodiments, one or more of Game Logic 210 can be executed within a virtual machine. Multiple instances of Game Logic 210 may execute on the same instance of Operating System 215. For example, FIG. 2 illustrates Game Logic 210A and Game Logic 210B both executing on the same Operating System 215. Instances of Game Logic 210 executing on the same Operation System 215 may, or may not, be configured for playing the same video game. For example, Game Logic 210A, 210B and 210C may all be World of Warcraft® clients, or may be clients of World of Warcraft®, Eve® and Call to Arms® respectively.

In some embodiments, the game environments determined by Game Logic 210 are passed to an optional Virtual 3D Video Driver 220. Virtual 3D Video Driver 220 is configured to appear, from the point of view of Game Logic 210, as a non-virtual 3D video driver controlling a graphics processing unit. Each instance of Game Logic 210 may be associated with its own instance of Virtual 3D Video Driver 220, or Virtual 3D Video Driver 220 may be shared by two or more instances of Game Logic 210. In some embodiments, game audio determined by each Game Logic 210 is passed to an optional Virtual Audio Driver 285. Game audio includes sound data configured to be presented to a game player as part of an audio stream. The game audio can result from rules of the game, e.g., shooting a gun should result in a popping sound, or may be received from other sources such as music tracks, members of Clients 110, a microphone, and/or the like.

In alternative embodiments, Game Logic 210 is configured to include the functionality, as discussed herein, of Virtual 3D Video Driver 220 and/or Virtual Audio Driver 285. In these embodiments, Virtual 3D Video Driver 220 and/or Virtual Audio Driver 285 are not required.

Virtual 3D Video Driver 220 is further configured to pass the received game environments to a (non-virtual) 3D Driver 230. Optionally the delivery of game environments to 3D Driver 230 is coordinated by the various instances of Virtual 3D Video Driver 220. For example, delivery can be coordinated such that 3D Driver 230 receives game environments from only one or a minimum number of Virtual 3D Video Driver 220 at a time. In typical embodiments, each of Virtual 3D Video Driver 220 is configured such that they appear to be a separate process and a separate source of video data to 3D Driver 230. As such, 3D Driver 230 is configured to keep track of which video data results in which video frames after rendering.

The video data received by 3D Driver 230 are passed to Graphics Processing Unit (GPU) 235 for rendering into raw video frames. Graphics Processing Unit 235 is optionally used to render more than one video stream in parallel. For example, Graphics Processing Unit 235 may generate a first video stream based on video data received from Game Logic 210A, generate a second video stream based on video data received from Game Logic 210B, generate a third video stream based on video data received from Game Logic 210C, etc. in parallel. The parallel production of video streams includes the generation of these streams at the same time. However, parallel production of video streams may, but does not necessarily, include the processing of individual frames at the same time within Graphics Processing Unit 235. For example, in some embodiments 3D Driver 230 alternatively passes the video data generated by the various members Game Logic 210 to Graphics Processing Unit 235. Data generated by Game Logic 210A is used to make a video frame, and subsequently data generated by Game Logic 210B is used to make a video frame, etc. In this case, the video streams are produced in parallel while individual frames are produced in series. Alternatively, more than one video frame may be generated within Graphics Processing Unit 235 at the same time. In this case a first part of Graphics Processing Unit 235 is used to generate one frame while a second part of Graphics Processing Unit 235 is used to generate a second frame, the first and second frames arising from video data produced by different Game Logic 210. In some embodiments, one set of graphical computation cores is used to generate the first frame while a second set of graphical computation cores is used to generate the second frame, at the same time. The resulting video frames are passed back to the control of 3D Driver 230.

Virtual 3D Video Drivers 220 are optionally configured to manage the transfer of raw rendered video frames from 3D Driver 230. For example, Virtual 3D Drivers 220 may be used to coordinate the transfer of video frames from the control of 3D Driver 230 to a Shared Memory 240. (Following rendering, the video frames are in a memory of Graphics Processing Unit 235 or a memory managed by 3D Driver 230. In either case they are under the control of 3D Driver 230.) As Virtual 3D Video Drivers 220 manages the communication of video data and frames to and from 3D Driver 230, in some embodiments, they are capable of placing the video frames within parts of Shared Memory 240 associated with specific Video Dynamic Encoding Pipelines (DEPS) 245. The Video DEPS 245 are individually identified as Video DEP 245A, Video DEP 245B, Video DEP 245C, etc. In these embodiments, each Video DEP 245 is assigned specific memory locations within Shared Memory 240, and is configured to retrieve video data from those locations.

In other embodiments, Virtual 3D Drivers 220 are configured to manage the transfer of video data to Shared Memory 240 based on timing. In these embodiments, the transfers managed by each of Virtual 3D Drivers 220 are synchronized and the Virtual 3D Drivers 220 notify each Video DEP 245 when data for them is in Shared Memory 240. Once this data is retrieved by the notified member of Video DEPS 245, data for another member of DEPS is transferred from 3D Driver 230 to Shared Memory 240 under the control of Virtual 3D Video Drivers 220. In these cases pixels read back from the local GPU memory to Shared Memory 240 can be based on a schedule. As used herein the terms "in sync" and "synchronized" are meant to mean that the two events are related in time by a schedule, by a timing signal, by a time delay, or that one event does not start until the other event has satisfied a condition, e.g., has completed. For example, Virtual 3D Drivers 220 may operate in sync such that a game environment is provided to 3D Driver 230 from a first of Virtual 3D Drivers 220 once Graphics Processing Unit 235 has completed rendering of a game environment from a second of Virtual 3D Drivers 220. The timing of this synchronization is optionally selected to make optimum use of Graphics Processing Unit 235.

As a result of the management by Virtual 3D Video Drivers 220, the multiple video streams can be stored in Shared Memory 240 without confusing which frames belong to which video stream. Shared Memory 240 is optionally configured to store audio as well as video data. This audio data may be stored and/or managed in ways similar to that discussed with respect to video data.

Virtual Audio Drivers 285 are optionally part of a virtual I/O shell between Game Logic 210 and OS 215. They are configured to appear from the point of view of Game Logic 210 as an audio driver and to pass any audio data they receive from Game Logic 210 to one of Audio DEP 270. For example, in some embodiments, the Virtual Audio Driver 285 associated with Game Logic 210A is configured to send audio data to Audio DEP 270A, and the Virtual Audio Driver 285 associated with Game Logic 210B is configured to send audio data to Audio DEP 270B, etc.

One or more of Game Logic 210 are optionally each associated with an Add-on Environment 287. Add-on Environments 287 include hardware, firmware and/or software stored on a computer readable medium and are configured for the associated Game Logic 210 to access add-ons and/or add-on data. For example, in some embodiments Add-on Environment 287 includes a directory structure configured to store add-ons and/or add-on data. The specific directory structure can depend on the identity of Game Logic 210A or 210B. For example, if the Game Logic 210A is configured to look for add-ons in a subdirectory called "add-ons" and to look for add-on data in subdirectories of the add-ons directory, then the Add-on Environment 287 can include these subdirectories or virtual representations of these subdirectories. Typically, Add-on Environments 287 are configured such that Game Logic 210A can operate as if the add-on were installed locally to Game Logic 210A, e.g., within the same directory structure or in the same local file system as Game Logic 210A. This allows the use of instances of Game Logic 210A and add-ons that are configured for installation together on the same computing device, even when Game Logic 210 and the associated add-ons are installed on separate computing devices coupled by an embodiment of Network 115 such as the internet.

In some embodiments Add-on Environments 287 include computing instructions configured to redirect communications between Game Logic 210 and add-ons (and add-on data) stored at one of Clients 110, Add-on Server 165, and/or other locations within Video Server System 120. For example, Add-on Environments 287 can include computing instructions to send and receive messages via an API of Game Logic 210 and to redirect these messages. Add-on Environments 287 optionally include a filter configured to identify which messages from the API should be redirected and to redirect particular messages to different locations as needed. A similar filter can be included local to the Add-on. This filter can also be considered part of Add-on Environments 287 and is configured to receive messages (e.g., data or commands) from the add-on and direct these messages to the associated member of Game Logic 210. For example, when an add-on responds to a request or command from Game Logic 210A the response to the request or command is redirected back to Game Logic 210A. The redirection that occurs in either direction can include communication of data packets via network 115. Add-on Environments 287 are typically generated by or include parts of Add-on Manager 160.

Shared Memory 240 includes random access memory (RAM) or a similar memory configured for efficient reading and writing of video data. Shared Memory 240 is configured to store video data for a plurality of different Video DEP 245. Video data for different Video DEPs 245 is optionally stored at the same time in Shared Memory 240. Shared Memory 240 may consist of a single hardware device or may include multiple devices.

Video DEPs 245 are dynamically allocated encoding pipelines that are each configured to encode video data rendered using Graphics Processing Unit 235. Each member of Video DEPs 245 is configured to encode to video formats specified at the time the Video DEP 245 is provisioned. This format specification is typically based on the needs of one of Clients 110 and/or the capabilities of the communication path between Video Server System 120 and the Client 110. Video DEPs 245 are optionally provisioned dynamically in response from a request from one of Clients 110. For example, when Client 110A connects to Video Server System 120 and sends a request for a video stream, Video DEP 245 can be provisioned to include elements, such as an encoder, selected specifically to meet needs of Client 110A. As is discussed elsewhere herein, a member of Video DEPs 245 is optionally configured to use more than one encoding scheme.

Video DEPs 245 each include a Grabber 247 configured to grab video data from Shared Memory 240 and transfer this video data to a memory of the Video DEP 245. The Grabber 247 is optionally under the control of a member of Virtual 3D Video Drivers 220. For example, in various embodiments, Grabber 247 is controlled by a member of Virtual 3D Drivers 220 to grab the video data from a specific location within Shared Memory 240 and/or at a specific time in synchronization with the transfer of video data to other members of Video DEPs 245.

Video DEP 245 each optionally include an Overlay Logic 290 configured to overlay one or more video images on the video data, e.g., frames, generated by Graphics Processing Unit 235. An overlay is a first image to be placed on a second image, or a sound added to another sound. Overlays may be applied with varying levels of transparency. For example, the first image can be opaque and, thus, completely hide covered parts of the second image, or the first image can be partially transparent in which case the second image can still be somewhat visible under the first image. An overlay may cover all or part(s) of the underlying image. For example, an overlay may be configured to cover certain pixels within a larger area. In this case the overlay is mapped to pixels on a display of one of Clients 110 or mapped to pixels within an image generated by Graphic Processing Unit 235. The mapping can be accomplished in various ways. For example, a lower left pixel of the overlay may be assigned to a specific pixel on a video frame generated by Graphics Processing Unit 235. In some embodiments, Overlay Logic 290 is configured to resize an overlay prior to applying the overlay. Overlay Logic 290 is optionally located in other positions within Video DEP 245A. For example, after Preprocessor 250.

The overlays can include a wide variety of pixel/video images. For example, an overlay can include a real-time or static image of a game player received via the internet, a real-time or static image of a sporting (or other) event, an image of a input control (e.g., "a," "b," "TAB," "Return," "Space Bar," "Function Key," "Arrow," and/or other keys or input devices), a map, text, and/or the like. Overlays can vary widely in size and shape. In some cases the overlay is the result of rendering a 3D game environment. More than one overlay can be placed on an image. These overlays can be overlapping or separate. Overlays are optionally received in an encoded format and decoded prior to being applied.

The presence and content of overlays are optionally responsive to received game commands, identity of one or more game players, an account type, identity of a game being played, video captured from a prior or real-time sporting event or real-world game, game rules, and/or the content of video generated by Game Logic 210. For example, an overlay may include a menu resulting from receipt of a game command. An overlay may include content responsive to a pixel pattern, e.g., image, included within video generated by Game Logic 210. Overlay Logic 290 is optionally configured to apply multiple overlays to a single video frame and these overlays may be from different sources.

Overlay Logic 290 is optionally configured to apply an overlay after a video frame has been preprocessed using Preprocessor 250 and/or after encoding using one of Encoders 255. In some embodiments the overlay includes an image received at an input of Video Source 130 (e.g., I/O device 145) via the internet and Overlay Logic 290 includes video processing logic configured to generate the overlay from the image. The received image is optionally received from an image source such as a camera or a file storage.

Video DEPS 245 each optionally also include a Preprocessor (PRE) 250. Preprocessor 250 is configured to perform a color space conversion such as RGB to YUV and/or a scaling operation to increase or decrease the resolution of the video frame. Preprocessor 250 is optional in embodiments wherein the output of Graphics Processing Unit 235 is in the YUV color space or some other desired color space. Multiple Preprocessors 250 may be included in a Video DEP 245 configured to produce multiple video streams having video frames of different sizes.

Video DEPS 245 each include at least one Encoder (ENC) 255. Encoders 255 are individually identified as Encoder 255A, Encoder 255B, etc. Each of Encoders 225 is configured to encode the video data according to a specific codec, and optionally a specific color depth and/or frame size. For example, Encoders 225 may be configured to encode video data to Adobe Flash® standard, .flv, .wav, .avi, .mpg, H.264, H.263, On2, VP6, VC-1, WMA, and/or other codecs discussed herein.

A member of Video DEPS 245 may include one, two or more Encoders 255. These encoders may be configured to encode to different codecs and/or the different formats of the same codec. For example, Encoder 255A may be configured to encode according to a Flash standard at a first frame size and color depth while Encoder 255 is configured to encode to the same Flash standard at a second frame size and color depth. The identity of Encoders 255 within each member of Video DEPS 245 is typically determined at the time the Video DEP 245 is provisioned. For example, a single command or command set may be used to create (provision) Video DEP 245A and specify which components the created Video DEP 245A should include. The creation of Video DEP 245A is discussed further elsewhere herein. A member of Video DEPS 245 including two or more Encoders 255 is alternatively viewed as two or more separate Video DEPS 245 having some but not all components in common. For example, Video DEP 245A and Video DEP 245B may have the same Preprocessor 250 but different Encoders 255.

In one example, Encoder 255A is configured to use a codec for H.264 while Encoder 255B is configured to use a codec for H.263. Having two or more different encoders available enables Video DEP 245A to change encoding during delivery of a video stream. The change in encoding can be from one type of encoding to another, or merely a change in characteristics of a specific type of coding. For example, the characteristics may change in terms of color depth, number of frames per second, encoding options, number of pixels, and/or the like. In some embodiments, Video DEP 245A is optionally configured to switch between Encoder 255A and 255B in response to a change in the characteristics of Client 110A or the communication channel between Client 110A and Video Source 130.

In practice, when a different codec other than that being used is required a new Video DEP 245 is spawned and executed in parallel with the current Video DEP 245 for a short period of time. The new Video DEP 245 is optionally a branch of the original Video DEP 245. For example, some components of the original Video DEP 245 may be used in the new Video DEP 245. These two Video DEP 245 may have components logically arranged in a tree structure.

In some embodiments, Video DEP 245 are configured to use two or more different encoders to generate two or more different video streams at the same time. These video streams are based on the same game environment rendered by Graphics Processing Unit 255 and, thus, include essentially the same materials (with the possible exception of overlays) and can be sent to different places. For example, one of the video streams can be sent to Client 110A while the other is sent to Client 110B. Alternatively, one of the video streams can be sent to Client 110A and the other to a website where third parties can watch the video. This website is optionally part of a social networking site or a game player's site. The two different video streams may be different in the frame rate, encoding type, frame size, color depth, etc. For example a video stream delivered to a social networking website can be of much lower quality than the video stream delivered to a game player who is playing a game using Client 110A. The second video stream may be directed to a game player who is playing the game or to people who are merely observing the game play. A video stream is optionally directed to more than one place.

Video DEP 245A optionally includes one or more Post Processors (Post) 260. Individual examples of Post Processors 260 are labeled 260A and 260B. Post Processors 260 are configured to package an encoded video frame in a container in a format appropriate for communication over a network according to a public or proprietary network protocol. For example, some protocols such as Adobe RTMP require post processing while other video standards such as H.264 Annex B do not require post processing. Each of Post Processors 260 may be associated with a specific member of Encoders 255, or several Post Processors 260 may be configured to receive encoded video frames from one member of Encoders 255.

The output of Post Processors 260 is directed to I/O Device 145 for delivery to one or more of Clients 110. The Elements of Video DEPS 245 discussed herein include hardware, firmware and/or software stored on a computer readable medium. For example, each of Video DEPS 245 may represent a set of software loaded into memory and executing using an electronic processor.

Audio DEPs 270 are configured to receive audio data generated by members of Game Logic 210 and encode this audio data to audio packets. The encoded data packets are then sent to Clients 110 using I/O Device 145 and Network 115. Audio DEPs 270 are also optionally configured to place an audio overlay on the audio data received from Game Logic 210. Different Audio DEPs 270 are individually labeled 270A, 270B, 270C, etc.

As with Video DEPs 245, Audio DEPs 270 are typically allocated as needed and assigned to process audio data from a specific member of Game Logic 210. This audio data may be based on events within a video game. For example, actions taken by one or more players of the video game may result in audio data according to game rules (e.g., falling in water makes a splashing sound). Allocation of Audio DEP 270A is typically responsive to the same factors and performed in the same manner as allocation of Video DEP 245A. For example, the elements included in Audio DEP 270A may be responsive to needs of one of Clients 110. Audio DEP 270 may receive audio data from Shared Memory 240 and/or directly from one of Virtual Audio Drivers 285.

Audio DEP 270A optionally includes a Grabber 275 configured to receive audio data from one of Virtual Audio Drivers 285, to receive audio data from one or more sources external to Video Server System 120, and/or to get audio data from Shared Memory 240. For example, in some embodiments Grabber 275 is configured to retrieve data received from sources external to Video Source 130, such as one or more of Clients 110, over the internet. The audio received, from any of these sources, can include voice audio, music, sound effects, sound tracks, alerts, and/or the like. For example, the voice of a game player using Client 110A may be received from Client 110A, or the game player may provide music to be heard by a game player using another of Clients 110. Audio data may be received, as audio streams, from more than one game player in parallel.

Audio DEP 270A optionally further includes Overlay Logic 295. Overlay Logic 295 is configured to place one or more audio overlays on audio data generated by a member of Game Logic 210. The audio overlays can include audio, music, sound effects, sound tracks, alerts, and/or the like. For example, in some embodiments, an audio overlay includes voice data received as data packets from one or more game players over the internet. These data packets are optionally decoded by Overlay Logic 295 prior to being included in the overlay. Placement of overlays on the audio data generated by a member of Game Logic 210 optionally includes addition of this data to the generated audio data. All or part of an audio overlay can be received from a source external to Audio Source 130. For example, in some embodiments the overlay includes audio data received at I/O Device 145 via the internet and Overlay Logic 290 includes audio processing logic configured to generate an audio overlay from this audio data. When referring to audio overlays, the identities of which data is the overlay and which is the data on which the overlay is being applied may be arbitrary as, in some embodiments, audio data does not have a sense of layering order that can be possible in video data.

Audio DEP 270A further includes an Audio Encoder 280A. Audio Encoder 280A is configured to encode the audio data generated by a member of Game Logic 210 and the audio overlay into an audio packet according to an audio codec. The encoding is typically performed after the audio overlay(s) have been applied to the audio data.

Grabber 275, Audio Encoder 280A and Overlay Logic 295 include hardware, firmware, and/or software stored on a computer readable medium. Audio DEP 270B and Audio DEP 270C are alternative embodiments of Audio DEP 270A.

The operation of Video Source 130 is typically managed by a Controller 265. Controller 265 includes hardware, firmware and/or software stored on a computer readable medium. For example Controller 265 may include software stored in memory and executed using a microprocessor.

In some embodiments, Controller 265 is configured to allocate instances of Video DEP 245 and/or Virtual Audio Driver 285 in response to a request to play a game. For example, Controller 265 may be configured to first determine or receive the requirements for Video DEP 245A and Audio DEP 270A and then provision computing instructions that satisfy those requirements. Video DEP 245A and Audio DEP 270A are then associated with one of Game Logic 210 and one of Virtual 3D Driver 220. The provisioned Video DEP 245A is optionally configured to retrieve raw video data from a specific area within Shared Memory 240.

In some embodiments the requirements for Video DEP 245A and/or Audio DEP 285A are determined by querying a user of Client 110A. For example, Controller 265 may be configured to cause text messages to appear on Client 110A, the messages requesting that a user of Client 110A enter characteristics of a video stream desired by a user. These characteristics can include a connection type, a frame size, an encoding scheme, a frame rate, a color depth, and/or the like. The entered characteristics are conveyed back to Controller 265, which then used these characteristics to select elements to include in Video DEP 245A and/or Audio DEP 270A when they are provisioned. For example, if the user requests a specific encoding scheme, then an Encoder 255 configured to use the requested encoding scheme is selected and included in Video DEP 245A.

In some embodiments the requirements for Video DEP 245A and/or Audio DEP 270A are determined automatically. For example, information gathered using a client qualifier can be used to determine the requirements for Video DEP 245A. In this example, if Client 110A includes only a Microsoft Silverlight® decoder and an Adobe Flash® decoder, then at least one of the corresponding encoder configurations or variants thereof is required in Video DEP 245A. Characteristics of the video stream to be generated using Video DEP 245A, such as frame size, color depth and frame rate, can also be determined by Controller 265 in this way.

In some embodiments the requirements for Video DEP 245A and/or Audio DEP 285A are determined automatically. For example, information gathered using a client qualifier can be used to determine the requirements for Video DEP 245A. In this example, if Client 110A includes only a Microsoft Silverlight® decoder and an Adobe Flash® decoder, then at least one of the corresponding encoder configurations or variants thereof is required in Video DEP 245A. Characteristics of the video stream to be generated using Video DEP 245A, such as frame size, color depth and frame rate, can also be determined by Controller 265 in this way.

The determination of requirements for Video DEP 245A and/or Audio DEP 270 may include both the use of characteristics provided by a user and characteristics automatically determined. In some embodiments, the possible characteristics are limited by a user's account type, payment and/or subscription. For example, a user may pay to receive a higher quality video stream.

Controller 265 may also manage sharing of Shared Memory 240. For example, Controller 265 may configure Video DEP 245A and/or Audio DEP 285A to use specific memory locations within Shared Memory 240 and/or Controller 265 may be configured to configured Video DEP 245A and/or Audio DEP 285A to access Shared Memory 240 in response to certain timing signals. The timing signals being timed for synchronization of access to Shared Memory 240 by different Video DEPS 245.

Figure 3:
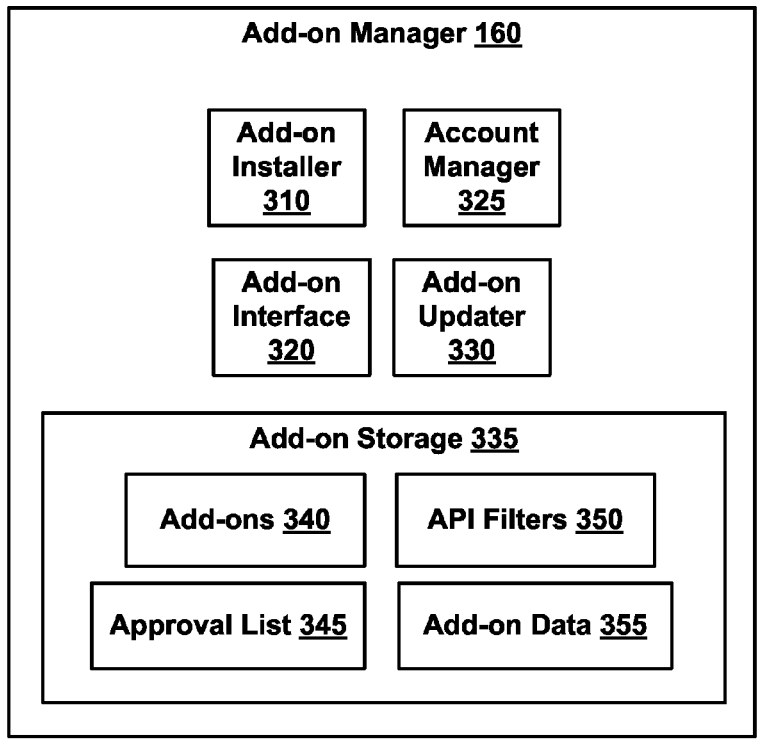
FIG. 3 illustrates further details of an add-on manager, according to various embodiments of the invention

FIG. 3 illustrates further details of Add-on Manager 160, according to various embodiments of the invention. In general Add-on Manager 160 is configured to enable remote selection and installation of add-ons, to facilitate execution of add-ons using add-on environments, to manage add-on data, to associate add-ons and add-on data with specific user (game player) accounts or avatars, and/or the like. Add-on Manager 160 typically includes software stored on a computer readable medium, but may also include firmware or hardware. Add-on Manager 160 can be disposed on a single computing device or distributed among more than one computing device. For example, in various embodiments, components of Add-on Manager 160 are disposed on Video Server System 120, Add-on Server 165 and/or Client 110B.

Add-on Manager 160 includes an Add-on Installer 310 configured for installing add-ons in association with a computer program. As used herein, the association of an add-on and computer program is meant to indicate that the add-on is configured to augment or otherwise extend the functionality of the computer program. Typically, the add-on is configured for association with a specific computer program. The installation is optionally performed remotely, e.g., an installation at Video Server System 120 can be performed in response to commands received from Client 110B via Network 115. These commands are received and processed by Add-on Manager 160.

The installation performed by Add-on Installer 310 can include creation of an Add-on Environment 287 having characteristics compatible with execution of the add-on. As discussed elsewhere herein, an Add-on Environment 287 can include a directory structure, computing instructions configured to redirect communications, etc. For example, the installation can include the creation of directories, subdirectories, or other elements of a directory structure, relative to Game Logic 210. In some embodiments, the installation includes the addition of computing instructions configured to redirect messages to other devices. The installation of these computing instructions can be at locations of Game Logic 210 and/or of the add-on.

Installation can be commenced and controlled via an Add-on Interface 320. Add-on Interface 320 includes a user interface configured for presentation to users of Clients 110, computing instructions configured to generate and communicate this user interface via Network 115, and/or computing instructions configured to receive commands entered by the user via the interface. In various embodiments, the user interface is configured for a user to select add-ons to be installed, pay for add-on or add-on data storage space, select which add-ons should be activated for particular avatars, turn on and off add-ons, update add-ons, to managed an approved add-on list, and/or de-install add-ons. Selections and the entry of commands is typically accomplished by clicking or entering text, etc., in that part of Add-on Interface 320 that is presented by a user. The results of these actions are communicated to other parts of Add-on Interface 320 for processing. Part of Add-on Interface 320 is optionally included in a video stream communicated to Clients 110 as an overlay.

Using Add-on Interface 320 a user can install one or more add-ons remotely on Video Server System 120 or Add-on Server 165, and/or install appropriate computing instructions for redirection at locations of add-ons and Game Logic 210 remote from Clients 110. For example, a user may select one or more add-ons from a list of approved add-ons. This list of approved add-ons is optionally stored in Storage 155 or Add-on Server 165. Approved add-ons are add-ons that have been qualified for use with Game Logic 210 by a game publisher, a manager of Video Server System 120, or other authority. Using Add-on Interface 320 the user can optionally also select which account, avatar and/or game the add-ons should be associated with and where the add-on should be stored, e.g., at one of Clients 110, at Video Server System 120, and/or at Add-on Server 165. For example, the user may specify that an add-on should only be used with one or more specific avatar but not with another avatar.

In some embodiments of the invention a user is limited in the number of add-ons and/or amount of add-on data storage the user has available. This limit is managed by Add-on Manager 160 and may be increased by purchasing additional space. For example, in one embodiment, a user receives three virtual "slots" in which add-ons can be placed and can purchase additional slots by paying money or performing some action such as bringing in additional players.

Add-on Manager 160 is optionally configured for a user to turn on and off installed add-ons. For example, a user may wish to use an add-on only when engaging in certain in-game activities such as player versus player encounters. Turning off an add-on does not necessarily mean that it is de-installed. In some embodiments, add-ons that are off do not require an add-on slot. In these embodiments, a user can have more add-ons installed than available slots. Alternatively, each installed add-on, whether or not active, may require a slot.

In some embodiments Add-on Manager 160 is configured to update add-ons. These updates can be manual and/or automatic. Manual updates include, for example, a user providing Add-on Manager 160 with a web address of an add-on publisher or with add-on code. The add-on can be retrieved by the Add-on Manager 160 from the publisher or from one of Clients 110. Automatic add-on update includes automatic retrieval of an add-on from an add-on publisher or other source. For example, when an add-on is detected as being out of date, Add-on Manager 160 is optionally configured to automatically request an update from a publisher or other source of that add-on and automatically install the update if available. This process can be transparent to the game player. In some instances, Add-on Manager 160 will wait until an add-on is available from the source and then perform the update.

With either manual or automatic add-on updates, Add-on Manager 160 is optionally automatically configured to detect when an add-on is out of date and notify the user. Add-on Manager 160 may also be configured to receive a notice from an add-on publisher that a new version of an add-on is available.

Add-on Manager 160 is optionally configured for a user of Clients 110 to manage add-ons via Add-on Interface 320. This management performed via Add-on Interface 320 can include, for example, updating add-ons, purchasing add-ons, configuring add-ons, moving add-ons, viewing installed add-ons, activating and inactivating add-ons, installing add-ons, de-installing add-ons, and/or the like. In some embodiments, Add-on Interface 320 is configured to perform any add-on management function that could be performed on a client side add-on. The de-installation optionally includes the removal of computing instructions configured for the redirection of messages between an add-on and Game Logic 210, and/or the removal of an Add-on Environment 287. As discussed elsewhere herein, in some embodiments Add-on Manager 160 is configured to automatically update add-ons. The update mode is optionally managed using Add-on Interface 320.

Add-on Manager 160 optionally further includes an Account Manager 325 configured to manage the association of add-ons and/or add-on data with a user of Client 110B or other Clients 110. When an add-on is installed by a user (game player), Account Manager 325 associates the add-on with a specific video game, user, account of the user, and/or avatar. Typically this association is stored as part of a list of add-ons installed by each user. When a user starts a video game, Account Manager 325 reads this list and identifies add-ons associated with the user. These add-ons and the appropriate add-on environments are then provisioned along with the provisioning of Game Logic 210, Video DEP 245A and/or Audio DEP 270A. Add-ons are optionally further provisioned or de-provisioned as the user switches between avatars or activates and de-actives add-ons.

Account Manager 325 manages storage of add-on data in association with a user when the user is not playing a video game. The add-on data may be stored at Storage 155, Add-on Server 165 and/or Client 110. When game play is started this data is typically copied to the appropriate Add-on Environment 287 for use by one or more provisioned add-on. When game play is completed the copy of the add-on data in the Add-on Environment 287 is used to update the stored copy. The add-on data is stored in a database, file structure or the like and includes identifying information, such as a record index or a file name, configured to identify the add-on data as belonging to a specific user (i.e., game player). In some embodiments Account Manager 325 maintains an index configured to indicate which files of add-on data belong to a specific user and/or are associated with a specific account or avatar.

In various embodiments, Account Manager 325 is configured to manage the number of add-on slots and/or storage accessible to each user, to charge the user for extra slots and/or storage, and/or to offer the user extra slots or storage for purchase. For example, if a user attempts to activate more add-ons than there are slots available, Account Manager may use Add-on Interface 320 to offer the user an opportunity to purchase more slots.

Add-on Manager 160 optionally further includes an Add-on Updater 330, configured to update add-ons. Updates can occur when a new version of an add-on is available or in response to new versions of Game Logic 210. For example, when a new version of Game Logic 210 is released by a game publisher third party add-ons for that game will typically need to be tested and/or updated. Add-on Updater 330 is configured to monitor for such events, e.g., release of new versions of add-ons and Game Logic 210, and to perform updates in response. In some embodiments, the process includes receiving information that indicates that a new version of Game Logic 210 is available, notifying add-on publishers that an updated version of an add-on is required, receiving the updated add-on, and replacing the out of date add-on with the updated add-on. Any or all of these steps can be performed automatically or can involve input from a user of Client 110B. In some embodiments, Add-on Updater 330 is configured to automatically retrieve add-ons from a third party location, such as an ftp server or website.

Add-on Manager 160 further includes an Add-on Storage 335. Add-on Storage 335 includes at least one electronic storage device configured to store data, images, and/or executable computing instructions. For example, Add-on Storage 335 can include volatile or non-volatile memory, a hard drive, and optional drive, static or dynamic random access memory, and/or the like. Add-on Storage 335 is optionally distributed among a plurality of devices including Video Server System 120, Add-on Server 165 and Clients 110.

Add-on Storage 335 optionally includes Add-ons 340. Add-ons 340 comprise data, images, executable code, scripts, or other game content configured to be used to extend the functionality of Game Logic 210. Add-ons 340 may be installed as add-ons on Video Server System 120, Add-on Server 165, Clients 110, or elsewhere. Add-ons 340 are optional in embodiments where add-ons are retrieved for execution directly from third party sources. Add-on Storage 355 optionally further includes an Approval List 345 of approved Add-ons 340. The computing instructions within Add-ons 340 are optionally shared by more than one game player. For example, a single add-on, when provisioned, can be associated with both Game Logic 210A and Game Logic 210B, different computing threads independently accessing the computing instructions.

Add-on Storage 355 optionally includes API Filters 350. API Filters 350 comprise the computing instructions configured to redirect communications between one of Add-ons 340 and Game Logic 210, as discussed elsewhere herein. Such computing instructions may be configured such that an add-on on Add-on Server 165 or one of Clients 110 can be used to extend functionality of Game Logic 210 on Video Server System 120. Alternatively, using API Filter 350 an add-on on Video Server System 120 or on Add-on Server 165 may be used to extend the functionality of Game Logic 210 installed on one of Clients 110. When API Filters 350 are installed in proper locations, an add-on can be used to extend functionality of a computer program even when the add-on and computer program a separated by Network 115.

Add-on Storage 355 optionally includes Add-on Data 355 included with, generated or organized by an add-on. Add-on Data 355 may include data generated by more than one add-on. Typically, this data is copied to the appropriate Add-on Environment 287, when game play is initiated or an Add-on 340 is activated. When game play is completed the add-on data in the Add-on Environment 287 is used to update the copy of the add-on data stored in Add-on Storage 355.

Figure 4:
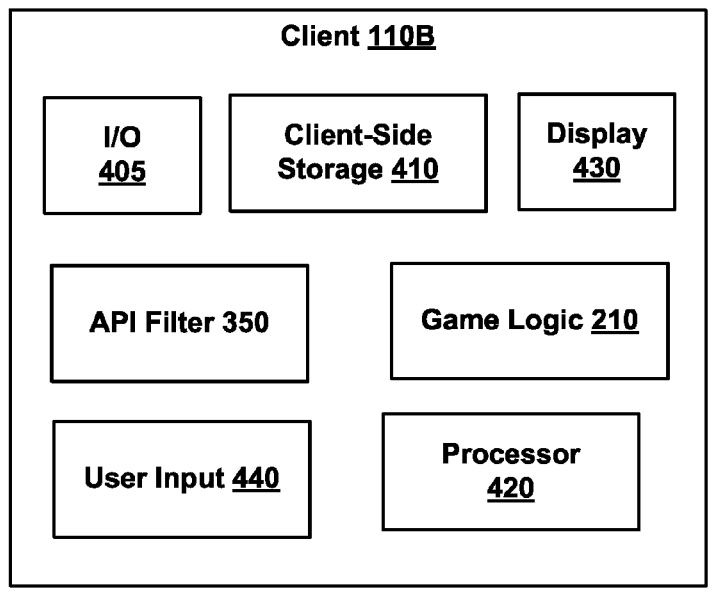
FIG. 4 illustrates further details of a client, according to various embodiments of the invention.

FIG. 4 illustrates further details of a client, according to various embodiments of the invention. I/O 405 includes an input/output device configured for Client 110 to send and/or receive information such as video, commands, add-ons, add-on data, requests for information, a game state, client identities, player identities, game commands, security information, audio data, and/or the like. In some embodiments, I/O includes a modem or Ethernet port.

Client-side Storage 410 includes non-transitory analog and/or digital storage devices. For example, Client-side Storage 410 may include an analog storage device configured to store video frames. Client-side Storage 410 may include a computer readable digital storage, e.g. a hard drive, an optical drive, or solid state storage. Client-side Storage 410 is configured (e.g. by way of an appropriate data structure or file system) to store video frames, artificial frames, a video stream including both video frames and artificial frames, audio frame, an audio stream, add-ons, add-on data, and/or the like. Some of these add-ons can be associated with the instance of Game Logic 210 on Client 110B, while the same Game Logic 210 is also associated with add-ons installed on a device geographically remote form Client 110B.

API Filter 350 is part of an Add-on Environment 287 configured to redirect communications as discussed elsewhere herein. Processor 420 includes both a central processing unit (CPU) and at least one graphics processing unit (GPU). Display 430 is configured to display a video stream generated local to Client 110B and/or generated by Video Server System 120.

User Input 440 includes, for example, a keyboard, a joystick, a pointing device, a telephone, a force feedback device, a motion and/or location sensing device, a mouse, a touch screen, a neural interface, a camera, input devices yet to be developed, and/or the like.

Figure 5:
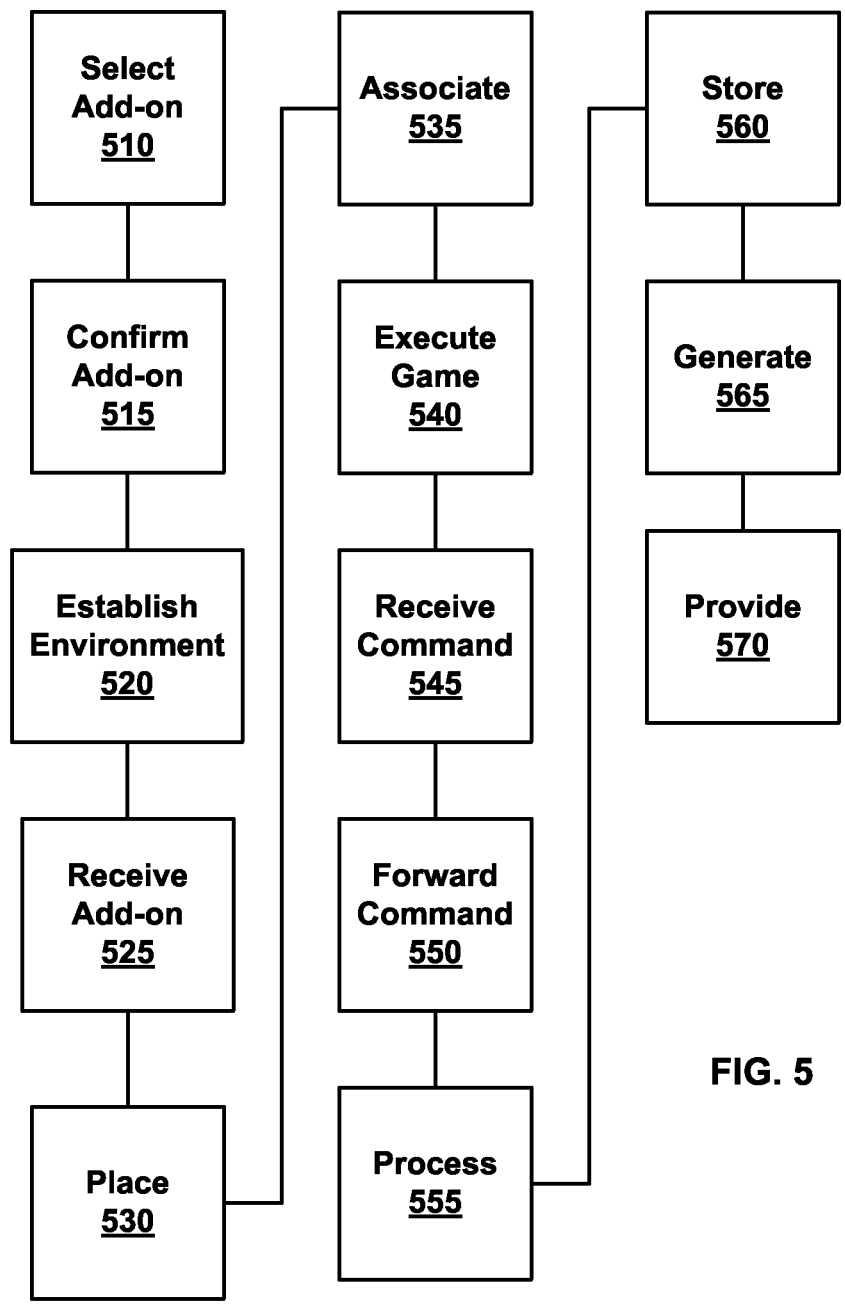
FIG. 5 illustrates methods of installing and/or using an add-on, according to various embodiments of the invention.

FIG. 5 illustrates methods of installing and/or using an add-on, according to various embodiments of the invention. These methods may be applied in embodiments in which the add-on is installed on Add-on Server 165, Video Server System 120, or one of Clients 110, and embodiments in which Game Logic 210 is installed on one of Clients 110 or Video Server System 120. Common to all these embodiments is that at least one of an add-on and the associated Game Logic 210 are installed and used at a location other than one of Clients 110 and separated from the one of Clients 110 by Network 115. For example, if Game Logic 210 is installed on Client 110B then at least one associated add-on is installed and used on a different member of Clients 110, Add-on Server 165, Video Server System 120, or a third party location. If Game Logic 210 is installed in a location other than Client 110B then add-ons can be installed on Client 110B, or any of the other locations discussed herein. Those steps of FIG. 5 involving installation of add-ons are optionally performed separately from those steps involving using the installed add-ons. Both installation and execution of an add-on may be initiated by a game player using one of Clients 110, or may be specified as part of a default configuration for Game Logic 210. Some embodiments include installing more than one add-on.

Considering first those embodiments in which Game Logic 210 is installed on Video Server System 120, the installation process can begin with a Select Add-on Step 510. In this step the add-on to be installed is selected, typically by a game player using one of Clients 110. The selection can be from a list of add-ons presented to the game player using Add-on Interface 320, or may include the game player selecting an add-on from a storage location or a third party source.

In some embodiments only approved add-ons can be selected. In these embodiments a Confirm Add-on Step 515 is optionally used to confirm that the selected Add-on 340 is included in an approved list of add-ons. This check can include looking for a name (or other identifier) of the add-ons in the approved list or comparing a checksum, URL, or other signature of an approved add-on with a corresponding characteristic of the selected add-on.

In an Establish Environment Step 520 Add-on Manager 160 is used to establish an instance of Add-on Environment 287 for executing the selected add-on. In various embodiments, the Add-on Environment 287 is established on Video Server System 120, Add-on Server 165, or one of Clients 110. For example, on Video Source 130 establishing the Add-on Environment 287 may include creating an appropriate directory structure such that the add-on can be installed in a location expected by the associated Game Logic 210. In a more specific example, if Game Logic 210 is configured to look in a subdirectory called "add-ons," relative to a directory of Game Logic 210, then Establish Environment Step 520 may include creating this subdirectory in the proper location.

Establishing Add-on Environment 287 on Add-on Server 165 or one of Clients 110 typically includes placing computing instructions configured to redirect communications between Game Logic 210 and the add-on, at appropriate locations. For example, a first API Filter 350 may be installed at an API of Game Logic 210 and a second API Filter 350 may be installed at a location at which the add-on will be executed. These API Filters 350 are configured to redirect messages to each other such that the add-on and the associated Game Logic 210, which are configured to operate together on the same computing device, can instead operate by communicating with each other over Network 115. Establishing Add-on Environment 287 optionally includes configuring each of the API Filters 350 such that can communicate with each other, regardless of where they are installed. For example, each of API Filters 350 may be configured with an IP address or universal resource locator of the corresponding API Filter 350.

In a Receive Add-on Step 525 the add-on to be installed is received from Storage 155, Add-on Storage 335, one of Clients 110 or a third party location. The add-on is optionally received via Network 115. The add-on is received at the location it is to be executed, e.g. the Add-on Environment 287 established in Establish Environment Step 520. Some embodiments of Receive Add-on Step 525 include communicating the add-on from, Add-on Storage 335, Client 110B or a third party location to Video Server System 120. Some embodiments of Receive Add-on Step 525 include communicating the add-on from Add-on Storage 335, Storage 155, or a third party location to Client 110B.

In a Place Step 530 the received add-on is installed/placed in the Add-on Environment 287 established in Establish Environment Step 520. This installation can occur within a directory structure of Video Source 130, or at the locations of API Filters 350 installed on Add-on Server 165, video Source 130, and/or Clients 110. Installation can include provisioning of computing instructions of the add-on and optionally provisioning of default add-on data. Establish Environment Step 520 is optionally performed after or at the same time as Place Step 530. For example, API Filters 350 can be installed after the add-on is installed. Place Step 520 optionally includes provisioning of add-on data along with the add-on. The add-on data may or may not be from the same location as the add-on. For example, the add-on may be received from Add-on Server 165 while the add-on data is received from Client 110B. The received add-on data can be default add-on data or add-on data that has been modified by actions of a game player.

In an optional Associate Step 535 the add-on installed in Place Step 530, and optionally the provisioned add-on data, are associated with a one of Clients 110 or a user of one of Clients 110, i.e. a game player. This association can involve inclusion of an identifier of the add-on in a list of add-ons assigned to the user or copying of the add-on into a directory assigned to the user. The association with the user can be specific to an account of the user, a user, a particular video game, one or more particular avatars, and/or the like. Associate Step 530 may be optional when the add-on is installed on one of Clients 110 or in a location that is already associated with an account, a user, etc. In such cases the association with a location, device, address, etc. may serve in place of or in addition to an association with a particular user.

Once an add-on is associated with an account, a user, or location, etc. it can be provisioned and/or used every time the user requests execution of Game Logic 210. For example, one or more add-ons associated with a user can be provisioned at approximately the same time as Game Logic 210A and Video DEP 245A. The provisioning process can include variation of Steps 510 through 530 as described herein. For example, when an add-on is provisioned after previously being installed Select Add-on Step 510 can merely include parsing a list of add-ons previously associated with a user or location, etc. Receive Add-on Step 525 can merely include retrieving the add-on and associated add-on data from one or more storage locations such as Storage 155, Add-on Storage 335, or Client Side Storage 410.

Once an add-on and any associated add-on data are provisioned, use of the add-on can begin with an Execute Game Step 540. In this step Game Logic 210 is executed, typically in response to a request received from one of Clients 110. The execution optionally includes communications between Video Server System 120 and Game Server 125 such that a state of a multiplayer video game is maintained at Video Server System 120.

In a Receive Command Step 545 a game command is received by one of Game Logic 210 from one of Clients 110. This typically occurs via Network 115. The game command can be a command configured for control of or use by an add-on. For example, the game command can be configured to cause the add-on to display certain information, to perform certain functions or can include data to be processed by the add-on.

In a Forward Command Step 550 the game command received in Receive Command Step 550 is identified as a command for the add-on and forwarded to the add-on. In embodiments in which the add-on is installed on the same computing device as Game Logic 210 that received the command, the command can be passed directly from the API of this Game Logic 210 to an API of the add-on. For example, the game command can be passed by the Game Logic 210A API to a memory location of the Add-on API.

In embodiments in which the add-on is installed on a different computing device than the executed Game Logic 210, API Filters 350 are used to communicate the received command between the Game Logic 210 and the add-on. For example, the command may be first communicated from Game Logic 210A to a first API Filter 350 on Video Source 130. This first API Filter 350 is configured to appear as the Add-on API from the point of view of the Game Logic 210A API. Thus the communication from Game Logic 210A to the first API Filter 350 can be accomplished by providing the command, or a pointer to the command, to a memory location of the first API Filter 350. The first API filter 350 is configured to communicate the command to a second API Filter 350 at the location of the add-on, e.g., at one of Clients 110B or Add-on Server 165. This communication can occur over Network 115 using TCP/IP, UDP/IP, or some other communication standard. Upon receipt of the command, the second API Filter 350 is configured to forward the command to the add-on. The second API Filter 350 is configured to appear as the Game Logic API from the point of view of the add-on. Thus, communication from the second API Filter 350 to the add-on can be accomplished by providing the command, or a pointer to the command, to a memory location of the add-on.

In a Process Command Step 555 the command is processed using the add-on. Processing can include the generation of add-on data. For example, the command may include data provided by a user or by Game Logic 210A. The command may cause the add-on to record or detect events in the game and generate add-on data based on these events. The command may cause the add-on to provide audio or image data for inclusion in an audio or video stream generated by Video Server System 120 to one of Clients 210. The command may cause an image to be converted between formats. For example, be converted to a pdf file. This audio or image data, or any other data resulting from Process Command Step 555, is optionally communicated to Video Server System 120 or one of Clients 110, for example, via Network 115. The command may cause any other result known in currently existing add-on technology.

In an Optional Store Step 560 add-on data generated in Process Command Step 550 is stored. This storage may be proximate to the add-on, or alternatively at a location in communication with the add-on via Network 115. For example, regardless of where the add-on is located the data may be stored on Video Server System 120, Add-on Server 165, and/or one of Clients 110. Storage may occur in real-time or after a delay. For example, in some embodiments a working copy of the add-on data local to the add-on is used during a specific execution of Game Logic 210A, and when this execution is completed the add-on data is stored elsewhere.

In an optional Generate Step 565 video data is generated as a result of the add-on processing the game command. For example, the game command may represent a request to have add-on data, locations, maps, text, notices, items, and/or the like displayed to a game player (or a sound presented to the game player). The video data may include two dimensional or three dimensional images. For example, to indicate a location of a resource a two dimensional image/symbol may be read from storage and converted to video data by being applied as an overlay. The use of overlays is discussed further in U.S. patent application Ser. No. 12/826,130 filed Jun. 29, 2010 and entitled "Video Game Overlay." The disclosure of this patent application is hereby incorporated herein by reference. Alternatively, the video data may be the result of the add-on adding a two or three dimensional object to a game environment which is then rendered to video data using GPU 235.

In an optional Provide Step 570, the video data generated in Generate Step 560 is provided to one or more of Clients 110 as part of a video stream. Typically, these Clients 110 include the member of Clients 110 from which the game command was received in Receive Command Step 545, and the video stream is provided via Network 115. For example, if the game command is received from Client 110B the video may be provided to Client 110A and a third destination, as well as Client 110B. The third destination can be a storage place, a website, a social networking site, a television, a phone, and/or the like.

Now considering those embodiments in which Game Logic 210 is installed on Client 110B and at least one add-on is external to Client 110B during use. In these embodiments Video Server System 120 is optional as the game environment can be generated based on a game state, the game environment can be rendered to video, and the video can be displayed, all on Client 110B. The game state can be based on state information received from Game Server 125, received from another member of Clients 110, and/or based solely on information within Client 110B. The steps illustrated in FIG. 5 may be varied as follows:

In Establish Environment Step 520 the Game Logic 210 and the add-on are necessarily on different computing devices. This is because, in the embodiments being discussed, Game Logic 210 is on Client 110B and at least one of Game Logic 210 and an add-on are on different computing devices separated by Network 115. Establish Environment step 520, therefore includes provisioning API Filters 350 at both the location of Game Logic 210 and the location of the add-on. In some embodiments, one Game Logic 210 and one add-on are both on Client 110B while at least one other add-on is on a different computing device, e.g. Add-on Server 165 and/or Video Server System 120. In these embodiments, Establish Environment step 520 is directed toward creating an Add-on Environment 287 for the add-on(s) on the different computing devices.

In Receive Add-on Step 525 the add-on is received at Add-on Server 165, Video Server system 120, a different Client 110, or a third party location, such as a web server, file server, or the like controlled by a developer of the add-on. In Place Step 530 the add-on is installed at a location other than the Client 110 on which the instance of Game Logic 210 to be augmented by the add-on is installed. For example, if Game Logic 210 is disposed on Client 210B, the add-on can be installed on Client 210C, Add-on Sever 165, Video Server System 120, or a third party location. Place Step 530 optionally includes communicating add-on data from Client 210B, Add-on Server 165, or Video Server System 120 to the location at which the add-on is installed.

In Associate Add-on Step 535 the list of add-ons used to save add-on associations is optionally stored on Client 210B. Execute Game Step 540 and Receive Command Step 545 are optionally confined to Client 110B. For example, Receive Command Step 545 may include communicating a command from User Input 440 to Processor 420, rather than communicating the command via Network 115. In Forward Command Step 550 the command received in Receive Command Step 544 is forwarded from Client 110B to the location of the add-on. Any data resulting from Process Step 555 is optionally communicated back to Client 210B.

In optional Store Step 560 data generated in Process Command Step 550 is stored on Client 110B, the location of the add-on, and/or elsewhere. Provide Step 570 can include merely providing the video data generated in Generate Step 560 from Processor 420 to Display 430. Although, is some embodiments, this video data can be also provided to other members of Clients 110 or to third party locations discussed herein.

Figure 6:
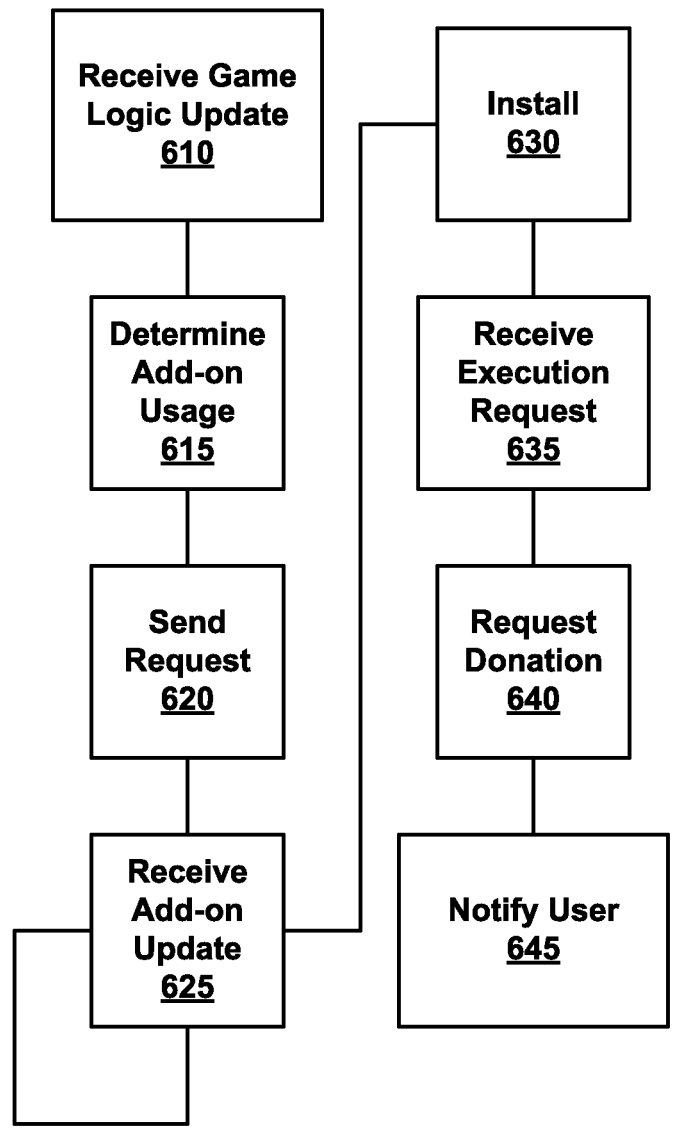
FIG. 6 illustrates methods of automatically updating an add-on, according to various embodiments of the invention.

Returning now to the more general case in which Game Logic 210 can be disposed on either Clients 110 or Video Server System 120. FIG. 6 illustrates methods of automatically updating an add-on, according to various embodiments of the invention. The add-on is typically updated in response to receipt of an updated version of Game Logic 210. Any combination of the steps illustrated in FIG. 6 can be performed automatically. It is possible that a request for an updated add-on is made before a request is received to execute the updated version of Game Logic 210. The methods illustrated in FIG. 6 are optionally used to update more than one add-on in response to receiving one updated Game Logic 210.

In a Receive Game Logic Update Step 610 a new version of Game Logic 210 is received at Video Source 130 or Client 210B. This new version is typically received from a publisher of the associated video game or an intermediary thereof. The new version is optionally received via Network 115. The new version of Game Logic 210 is configured to replace a previous version. Receive Game Logic Update Step 610 optionally includes disabling any out of date add-ons.

In a Determine Add-on Usage Step 615 it is determined whether an add-on has been used to augment the functionality of the previous version of Game Logic 210. Determine Add-on Usage Step 615 can include, for example, examining a list of add-ons associated with specific Game Logic 210, video game, users, user accounts, Clients 110, etc. This list may be maintained by Account Manager 325. Alternatively, Determine Add-on Usage Step 615 can include examining storage locations configured to store add-ons and looking for add-ons configured to augment Game Logic 210.

In a Send Request Step 620 a request for an updated add-on made. This request is typically made to a third party, such as a publisher of the add-on or intermediary thereof. The request includes an address to which the update should be provided, and optionally an identity of the add-on and new version of Game Logic 210 with which the add-on should be compatible. For example, the request may indicate that a new version of "Deadly Boss Mods" for the "World of Warcraft version 6.542" Game Logic 210 be sent to an address of Video Server 120, Add-on Server 165 or Client 110B. The request is optionally sent via Network 115. Send Request Step 620 can be performed between a time the updated version of Game Logic 210 is received in Receive Game Logic Update Step 610 and a first time a request to execute the updated version of Game Logic 210 is received. Send Request Step 620 can be performed automatically in response to receiving the new version of Game Logic 210 in Receive Game Logic Update Step 610. Send Request Step 620 is optionally repeated until an updated add-on is received. For example, the request can initially be sent every 10 minutes and later sent every hour.

In a Receive Add-on Update Step 625 the updated add-on is received at the address provided in Send Request Step 620. The updated add-on is configured to augment the new version of Game Logic 210 received in Receive Game Logic Update Step 610 and can be received via Network 115. Receive Add-on Update Step 625 is optionally performed between the time the updated version of Game Logic 210 is received in Receive Game Logic Update Step 610 and a time a first request to execute the updated version of Game Logic 210 is received.

In an Install Step 630 the updated add-on received in Receive Add-on Update Step 625 is installed. This installation may be in an add-on on storage such as Add-on Storage 335 or Client-side Storage 410. Alternatively, the installation may be in an Add-on Environment 287 where it can be used without further provisioning. The installation process is optionally similar to Place Step 530 as discussed with respect to FIG. 5. Install Step 630 is optionally performed automatically, e.g., without need for a game player to order the installation.

In a Receive Execution Request Step 635 a request to execute the new version of Game Logic 210, received in Receive Game Logic Updates Step 610, is received. This request is received from a game player via one of Clients 110, and is optionally received at Video Source 130 via Network 115. Receive Execution Request Step 635 may occur before or after any of Send Request Step 620, Receive Add-on Update Step 625 and Install Step 630.

In an optional Request Donation Step 640 a request to donate to a publisher of the add-on is presented to a game player. Typically this is the game player that made the request for execution in Receive Execution Request Step 635. The request to donate is optionally presented as an overlay on the video stream generated using Video Server System 120.

In an optional Notify User Step 645 the game player that made the request for execution in Receive Execution Request Step 635 is notified that an new version of the add-on has been received. The notice is optionally presented as an overlay on the video stream generated using Video Server System 120.

Several embodiments are specifically illustrated and/or described herein. However, it will be appreciated that modifications and variations are covered by the above teachings and within the scope of the appended claims without departing from the spirit and intended scope thereof. For example, while the example presented herein are directed at computer games, in other embodiments the systems and methods taught are applied to other types of computer programs. These other types of computer programs can include graphics programs, spreadsheets, word processors, database programs, accounting programs, project management programs, video editing programs, image editing programs, website development programs, inventory programs, e-mail programs, file management programs, document management/viewing programs, drawing/computer aided design programs, presentation programs, and/or the like. Further, while many of the examples discussed herein refer to a single add-on. The systems and methods disclosed can be applied to groups of add-ons. These groups can be handled as an add-on package.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. A game server system for execution of online gaming, the game server system comprising:
    a video source configured to generate video frames and to encode the video frames to a video stream for game logic of a video game, the video stream being based on a game environment of the video game, the game logic being augmented by an add-on, wherein the add-on includes computer instructions configured to augment functionality of the video game, the video game associated with a user account;
    add-on storage configured to store the add-on in a location accessible to the video game, and to store add-on data of the add-on in a location accessible to the add-on;
    an add-on manager configured to:
        create an add-on environment configured for use of the add-on by the video game;
        associate the add-on with the user account;
        during execution of the video game associated with the user account, access the user account to identify the add-on for execution with the game logic; and
    a processor configured to execute the game logic and the add-on manager for access and execution of the add-on identified from the user account; and
    an I/O device configured to communicate the video stream via a computer communication network to a geographically remote client and to receive game commands from the client, wherein the video stream integrates content from the game logic and the add-on at the game server system for display of the integrated content at the client.

2. The system of claim 1, wherein the video stream includes video data resulting from the add-on.

3. The system of claim 1, wherein the video source includes a dynamic encoding pipeline allocated in response to a request to play the video game.

4. The system of claim 1, wherein the add-on storage is local to the video source.

5. The system of claim 1, wherein the add-on environment includes a directory, wherein the add-on manager is further configured to install the add-on in the directory.

6. The system of claim 5, wherein the directory is on the same computing device as the game logic.

7. The system of claim 1, wherein the add-on environment includes computer instructions configured to redirect through the Internet communications between the game logic and the add-on.

8. The system of claim 1, wherein the add-on manager is configured to associate a plurality of add-ons with the user account.

9. The system of claim 1, wherein the add-on manager is further configured to install add-ons in response to commands received from the client via the computer communication network.

10. The system of claim 1, wherein the add-on manager is further configured to execute, activate or deactivate add-ons in response to commands received from the client via the computer communication network.

11. The system of claim 1, wherein the add-on data includes locations of objects within a game environment.

12. The system of claim 1, wherein the add-on manager is further configured to automatically update add-ons by retrieving add-on code from third party storage sites.

13. The system of claim 1, wherein the add-on manager is further configured to store a list of allowed add-ons.

14. The system of claim 1 wherein at least part of the add-on environment is separated from the game logic by the computer communication network.

15. The system of claim 1, wherein the add-on is installed on the geographically remote client.

16. The system of claim 1, wherein the add-on manager is further configured to receive a selection of the add-on via the user account.

17. A system comprising:
    a video source configured to generate video frames and to encode the video frames to a video stream for game logic of a video game, the video stream being based on a state of the game logic and game commands received from a geographically remote client, the game logic for execution to achieve functionality of the video game, the game logic associated with a user account;
    an add-on manager configured to access the user account to identify an add-on for execution during execution of the game logic, wherein the add-on includes computer instructions to add one or more functions to the functionality of the video game;
    a processor configured to access and execute the game logic and the add-on manager for execution of the add-on identified from the user account; and
    an I/O device configured to communicate the video stream via a computer communication network to the geographically remote client and to receive the game commands from the client, wherein the video stream integrates content from the game logic and the add-on at the system for display of the integrated content at the client,
    wherein the add-on manager is configured to update the add-on in response to receiving a new version of the game logic.

18. The system of claim 17, wherein the add-on manager is further configured to:
    create an add-on environment configured for use of the add-on by the video game;
    associate the add-on with the user account; and
    associate add-on data of the add-on with the user account.

19. The system of claim 17, wherein the add-on is installed on the same computing device as the game logic.

20. The system of claim 17, further comprising API filters configured to redirect communications between the game logic and the add-on via the Internet.

21. A system comprising:
one or more computing devices for providing one or more virtual machines, the one or more virtual machines coupled via a network,
the one or more computing devices including one or more processors and one or more storage devices,
the one or more processors configured to:
  receive a game command from a client device via a computer communication network;
  apply one or more rules of a game logic to the game command to determine a game environment;
  generate a video stream from the game environment, the video stream provided to play a video game, the video game associated with a user account;
  receive a selection of an add-on from the client device via the network, wherein the add-on includes computer instructions configured to augment functionality of the game logic;
  create a directory at a location expected by the game logic as having the add-on, wherein the directory is created based on the selection of the add-on;
  receive the add-on;
  provide the add-on for storage within the directory for access by the game logic;
  associate the add-on with the user account;
  during execution of the video game associated with the user account, access the user account to identify and access the add-on for execution with the game logic, wherein the video stream integrates content from the game logic and the add-on at the system for display of the integrated content at the client device,
the one or more storage devices for storing the directory and the add-on.

22. The system of claim 21, wherein the one or more processors are configured to create the directory at the location based on a name of the add-on, the name expected by the game logic.

23. The system of claim 21, wherein the one or more processors are configured to create a directory structure based on an identity of the game logic, the directory structure including the directory.

24. The system of claim 21, wherein the game environment includes a virtual environment, the virtual environment including in-game objects, avatars, locations of the in-game objects, shapes of the in-game objects, textures of the in-game objects, and spatial relationships therebetween.

25. The system of claim 21, wherein the video stream includes video frames for presentation at the client device.

26. The system of claim 21, wherein the one or more processors are configured to include an identifier of the add-on in a list of add-ons assigned to the user account to associate the add-on with the user account.

27. The system of claim 21, wherein the one or more processors are configured to copy the add-on into a directory assigned to the user account to associate the add-on with the user account.

28. The system of claim 17, wherein the game logic is configured to use a game state to determine the game environment from which the video stream is generated.

* * * * *